MONEY-HANDLING DEVICES

Filed June 7, 1962 6 Sheets-Sheet 1

INVENTORS
RAY G. ELLIS
BY JAMES N. STURDY
Ray Eilers
ATTORNEY.

INVENTORS
RAY G. ELLIS
BY JAMES N. STURDY

Ray Eilers
ATTORNEY.

INVENTORS
RAY G. ELLIS
BY JAMES N. STURDY
Roy Eilers
ATTORNEY.

June 1, 1965 R. G. ELLIS ETAL 3,186,532

MONEY-HANDLING DEVICES

Filed June 7, 1962 6 Sheets-Sheet 4

INVENTORS
RAY G. ELLIS
BY JAMES N. STURDY
Ray Eilers
ATTORNEY.

MONEY-HANDLING DEVICES

Filed June 7, 1962 6 Sheets-Sheet 5

INVENTORS
RAY G. ELLIS
BY JAMES N. STURDY
Ray Eilers
ATTORNEY.

MONEY-HANDLING DEVICES

Filed June 7, 1962 6 Sheets-Sheet 6

INVENTORS
RAY G. ELLIS
BY JAMES N. STURDY
Ray Eilers
ATTORNEY.

United States Patent Office 3,186,532

Patented June 1, 1965

3,186,532
MONEY-HANDLING DEVICES

Ray G. Ellis, Hanley Hills, and James N. Sturdy, Manchester, Mo., assignors to National Rejectors, Inc., St. Louis, Mo., a corporation of Missouri Filed June 7, 1962, Ser. No. 200,790
40 Claims. (Cl. 194—19)

Figure 1:
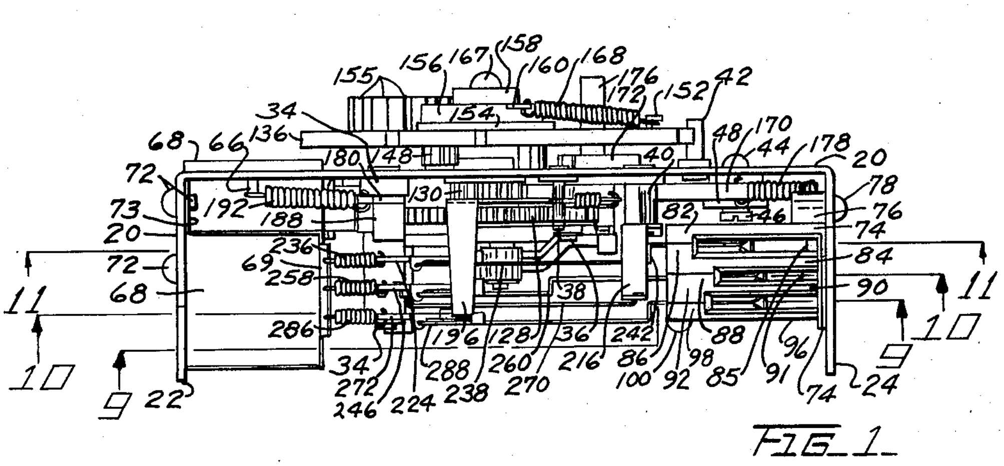

This invention relates to improvements in money-handling devices. More particularly, this invention relates to improvements in coin handling devices.

It is, therefore, an object of the present invention to provide an improved coin-handling device.

This invention is an improvement upon the invention disclosed and claimed in Gustav F. Erickson patent application Serial No. 147,871 for Money-Handling Devices, which was filed October 26, 1961.

The coin-handling device provided by the present invention has a rotatable ratchet wheel and has an advancing pawl which can selectively rotate with that ratchet wheel. A stop is mounted in the path of that pawl, and that stop will intercept that pawl and halt rotation of that pawl and of the ratchet wheel after that pawl and ratchet wheel have rotated a predetermined angular distance. That pawl must then move outwardly relative to the ratchet wheel; and that movement of that pawl must be easily accomplished despite forces which are developed between that pawl and the stop by the returning spring for the ratchet wheel. The present invention facilitates outward movement of the advancing pawl relative to the ratchet wheel by making the stop movable and by permitting that stop to move with that pawl, thereby providing a rolling engagement rather than a sliding engagement between that stop and that pawl. The overall result is that the stop can effectively halt rotation of the advancing pawl and ratchet wheel after that pawl and ratchet wheel have rotated the required angular distance, and can then move with that pawl as that pawl moves outwardly relative to the ratchet wheel. It is, therefore, an object of the present invention to provide a stop for the advancing pawl of a ratchet wheel which can provide a rolling engagement rather than a sliding engagement with that pawl as that pawl moves outwardly relative to that ratchet wheel.

The said stop is confined between limits; and those limits are set so that while the said stop is permitted to move it is always held in register with the advancing pawl of the coin-handling device. Further, those limits are set so the said stop can center itself relative to the advancing pawl, as that pawl moves into engagement with that stop. In addition, those limits are set so the said stop can move with the advancing pawl as that pawl moves outwardly of the ratchet wheel. It is, therefore, an object of the present invention to provide limits for a stop of a coin-handling device which will always hold that stop in register with the advancing pawl of that device, will permit that stop to center itself as that pawl engages it, and will permit that stop to move with that pawl as that pawl moves outwardly of the ratchet wheel.

A second stop is provided for the advancing pawl of the ratchet wheel provided by the present invention, and that second stop should normally be out of the path of that advancing pawl but should move into that path whenever that second stop is supposed to intercept and hold that pawl. Further, that second stop should continue to hold that advancing pawl until that pawl is supposed to move outwardly of the ratchet wheel; and, at that time, that second stop must permit that advancing pawl to move easily as it moves outwardly relative to the ratchet wheel. The present invention enables the second stop to normally be out of the path of the advancing pawl, to move into the path of that pawl when it is supposed to intercept and hold that pawl, to continue to hold that pawl until that pawl is supposed to move outwardly of the ratchet wheel, and then to permit that pawl to move easily as it moves outwardly of that ratchet wheel; and it does so by having one of the coin-actuated levers of the coin-handling device move that second stop. As a coin causes that coin-actuated lever to move, that lever will move the second stop into position to intercept and hold the advancing pawl, that lever will then hold that second stop in a position where it will continue to hold that pawl, and that lever will finally permit that second stop to move with that pawl as that pawl moves outwardly of the ratchet wheel; and the latter movement of the second stop will facilitate the outward movement of the advancing pawl by providing a rolling engagement rather than a sliding engagement between that pawl and the second stop. It is, therefore, an object of the present invention to cause one of the coin-actuated levers of the coin-handling device to move the second stop of that device into position to intercept and hold the advancing pawl of that device, to permit that second stop to remain in position to continue to hold that pawl, and thereafter to permit that second stop to move with that pawl as that pawl moves outwardly of the ratchet wheel.

The coin-operated lever which causes the second stop of the coin-handling device to move into position to intercept and hold the advancing pawl of that device must also move that second stop out of the path of that pawl. Yet that coin-operated lever must permit that second stop to move with that pawl as that pawl moves outwardly relative to the ratchet wheel; and this, despite the fact that the rates and exents of movemens of that lever and pawl are different. The present invention enables a coin-operated lever of the coin-handling device to move the second stop of that device into and out of pawl-intercepting position, while also permitting that second stop to move with that pawl as that pawl moves outwardly relative to the ratchet wheel, by providing a lost-motion connection between that coin-actuated lever and that second stop. It is, therefore, an object of the present invention to provide a lost-motion connection between a coin-actuated lever and a second stop of a coin-actuated device.

The lost-motion connection between the coin-actuated lever and the second stop of the coin-handling device of the present invention must not permit that second stop to prematurely move into pawl-intercepting position. The present invention provides an abutment on the actuator of that coin-actuated lever, and that abutment normally blocks movement of the second stop toward pawl-intercepting position; and hence that second stop is kept from prematurely moving into pawl-intercepting position. As the coin-actuated lever responds to the insertion of a coin, the actuator of that coin-actuated lever will move the abutment thereon out of the path of the second stop, and will thereby permit that second stop to move toward pawl-intercepting position. This means that the abutment on the actuator of the coin-actuated lever will keep the second stop from prematurely moving into pawl-intercepting position but will thereafter free that stop for movement to that position. It is, therefore, an object of the present invention to provide an abutment on the actuator of a coin-actuated lever which will normally block movement of the second stop of a coin-handling device but will respond to coin-inducted movement of that lever to free that stop for movement.

The coin-handling device provided by the present invention has a third stop which will intercept and hold the ratchet wheel after that ratchet wheel has been freed by the insertion of a nickel. That stop and the other two stops of the coin-handling device of the present invention are separate from the nickel-actuated lever, the dime-actuated lever, and the quarter-actuated lever; and this is desirable because it frees those levers from the stresses which the ratchet wheel imparts to those stops as that ratchet wheel is abruptly brought to rest by those stops. It is, therefore, an object of the present invention to make the stops of a coin-handling device separate from the nickel-actuated lever, the dime-actuated lever, and the quarter-actuated lever of that device.

The coin-handling device provided by the present invention responds to the insertion of coins of different denominations to provide different advancements of its ratchet wheel. One preferred embodiment of the present invention responds to a nickel to provide a unitary advancement of the ratchet wheel, responds to a dime to provide a two-unit advancement of that ratchet wheel, and responds to a quarter to provide a five-unit advancement of that ratchet wheel. The weights of nickels and quarters are amply large enough to assure prompt and full movements of the nickel-actuated lever and quarter-actuated lever. However, the weights of dimes—particularly of well-worn dimes—are much smaller than the weights of nickels and quarters; and hence the forces that are available to actuate the dime-actuated lever of the coin-handling device are much smaller than the forces that are available to actuate the nickel-actuated lever and the quarter-actuated lever. Yet, the dime-actuated lever must be able to respond, promptly and fully, to the weights of dimes—even to the weights of well-worn dimes. The present invention enables the dime-actuated lever to respond, promptly and fully, to the weights of dimes—even to the weights of well-worn dimes—by facilitating the freeing of the holding and advancing pawls from the teeth of the ratchet wheel. Specifically, the present invention makes that ratchet wheel and those pawls from materials which will provide a low coefficient of friction, and also provides angles for the leading faces of the teeth of the ratchet wheel which facilitate the freeing of the holding and advancing pawls from the teeth of that ratchet wheel. It is, therefore, an object of the present invention to make the ratchet wheel and the holding and advancing pawls of a coin-handling device from materials which will provide a low coefficient of friction, and to provide angles for the leading faces of the teeth of the ratchet wheel which facilitate the freeing of the holding and advancing pawls from the teeth of that ratchet wheel.

The coin-actuated levers of coin-handling devices customarily have actuators fixedly secured to them, and those actuators extend into coin chutes to intercept and be moved by coins introduced into those coin chutes. While the fixed securements of those actuators to those coin-actuated levers are useful as long as the coin chutes are precisely alined with the coin-actuated levers, those fixed securements are detrimental where mis-alinements of those coin chutes and coin-actuated levers permit the actuators of those coin-actuated levers to bind and stick against portions of those coin chutes. The present invention obviates fixed securements of the actuators to the coin-actuated levers, and thereby avoids all binding or sticking of those actuators against the coin chutes of the coin-handling device; and it does so by providing pivots that loosely secure those actuators to those coin-actuated levers. The free ends of the actuators are guided by the coin chutes, and those free ends will move easily and freely through elongated slots in those coin chutes. Those free ends will move easily and freely through those slots even if the coin chutes are mis-alined with the coin-actuated levers; and hence the pivoting of the actuators to the coin-actuated levers will coact with the guiding of the free ends of those actuators by the slots in the coin chutes to obviate all binding or sticking of those actuators against the coin chutes of the coin-handling device. It is, therefore, an object of the present invention to provide a coin-actuated lever with an actuator which is pivoted to it and that has the free end thereof guided by a coin chute.

Some coin-actuated machines have buttons or levers at the exteriors thereof which can be actuated by patrons to enable those patrons to select the desired products or services. In some of those machines, those buttons or levers cause feeling bars to "feel" for the amounts of credit that have been established by the patrons by the insertion of coins; and hence the actuations of those buttons or levers help determine whether the desired products or services will be dispensed. If the patrons prematurely actuate those buttons or levers, and then continue to hold those levers or buttons in actuated position, the feeling bars can keep the coin-handling devices used in those coin-actuated machines from properly accrediting the patrons with the values of the coins which they insert. Any such result is objectionable; and the present invention obviates any such result by providing a lost-motion connection between the credit-establishing ratchet wheel of a coin-handling device and the credit-readout of that device. That lost-motion connection will enable the ratchet wheel to advance in response to the insertion of coins even if the credit-readout is held against advancement by being engaged by a feeling bar. It is, therefore, an object of the present invention to provide a lost-motion connection between the credit-establishing ratchet wheel of a coin-handling device and the credit-readout of that device.

Some individuals have been known to apply sharp blows to coin-actuated machines to try to cause the coin-handling devices used in those machines to establish credits for which no corresponding coins have been inserted. It would be undesirable to permit blows to cause the coin-handling device of the present invention to establish credits for which no corresponding coins had been inserted; and the present invention is provided with a weighted lever that will keep blows from freeing the holding pawl of that device. It is, therefore, an object of the present invention to provide a coin-handling device with a weighted lever that will keep blows from freeing the holding pawl of that device.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 2:
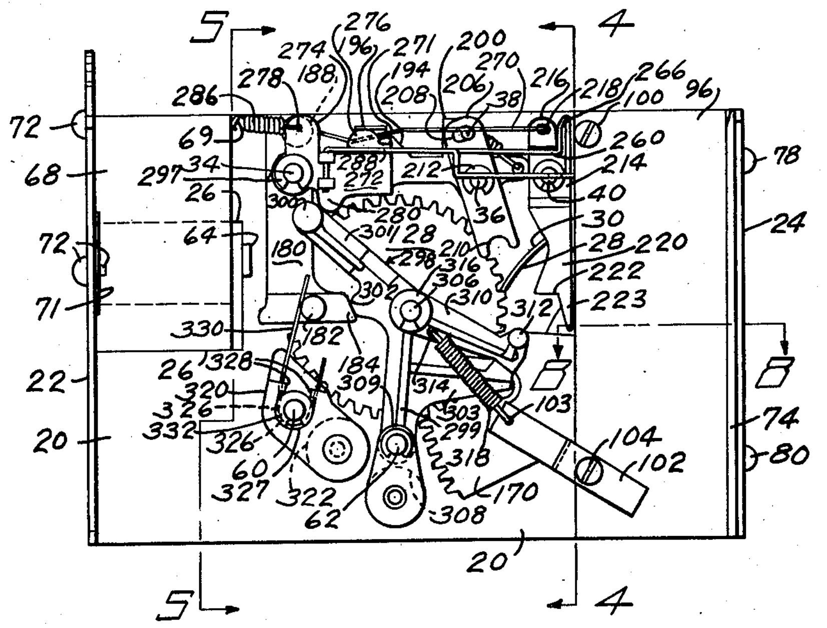
Figure 3:
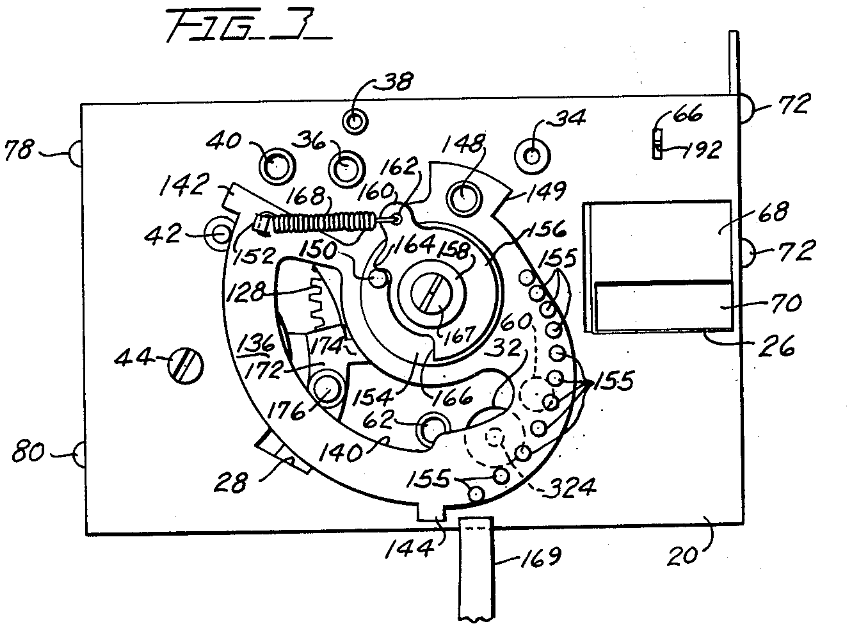
Figure 4:
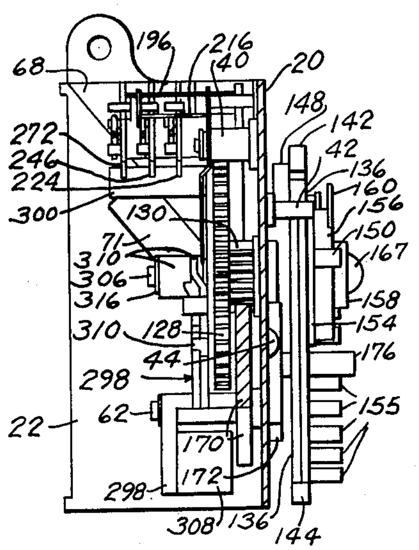
Figure 5:
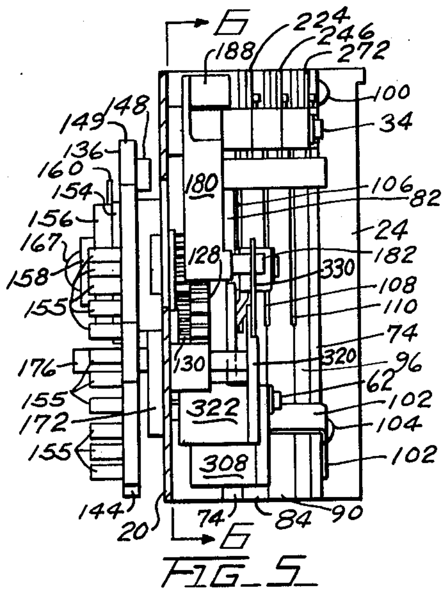
Figure 6:
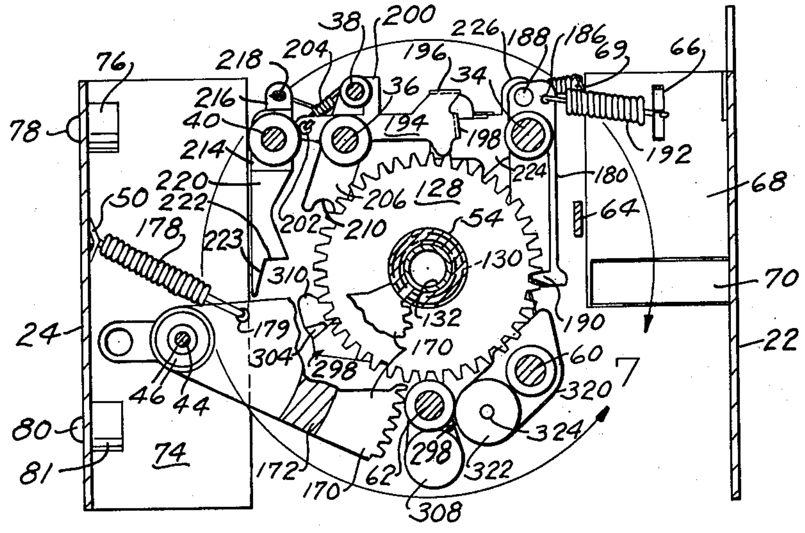
Figures 7, 8, 13:
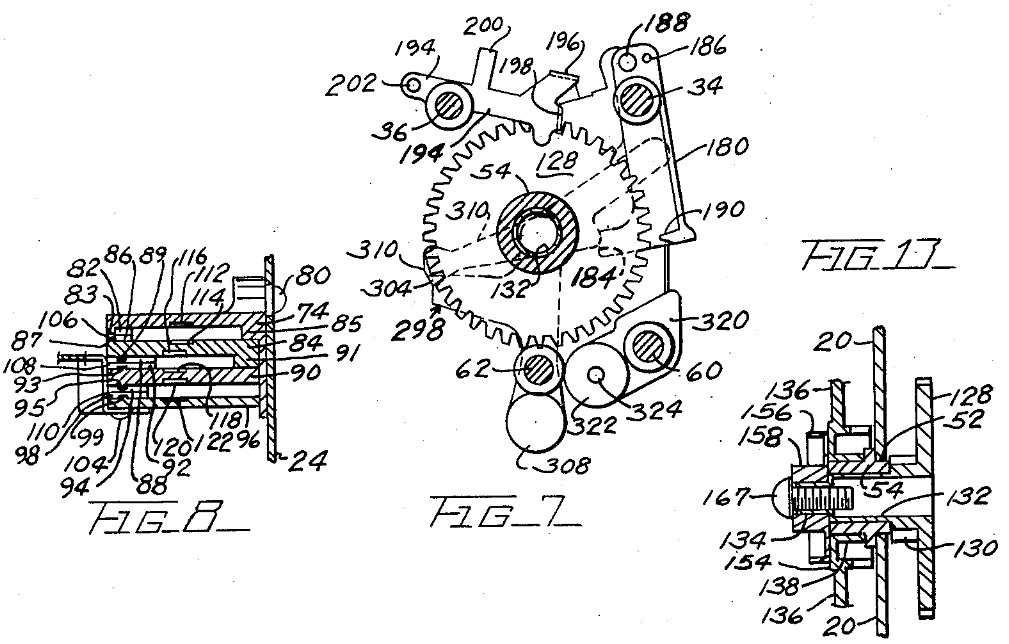
Figure 9:
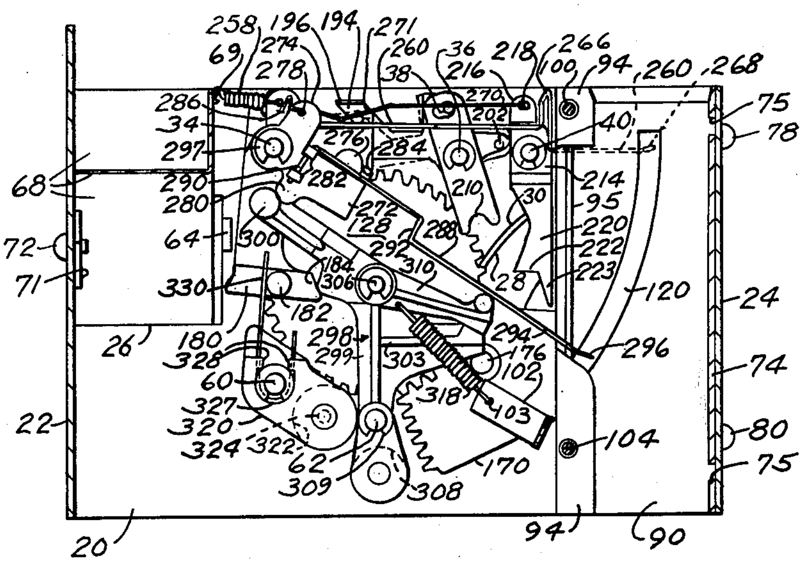
Figure 10:
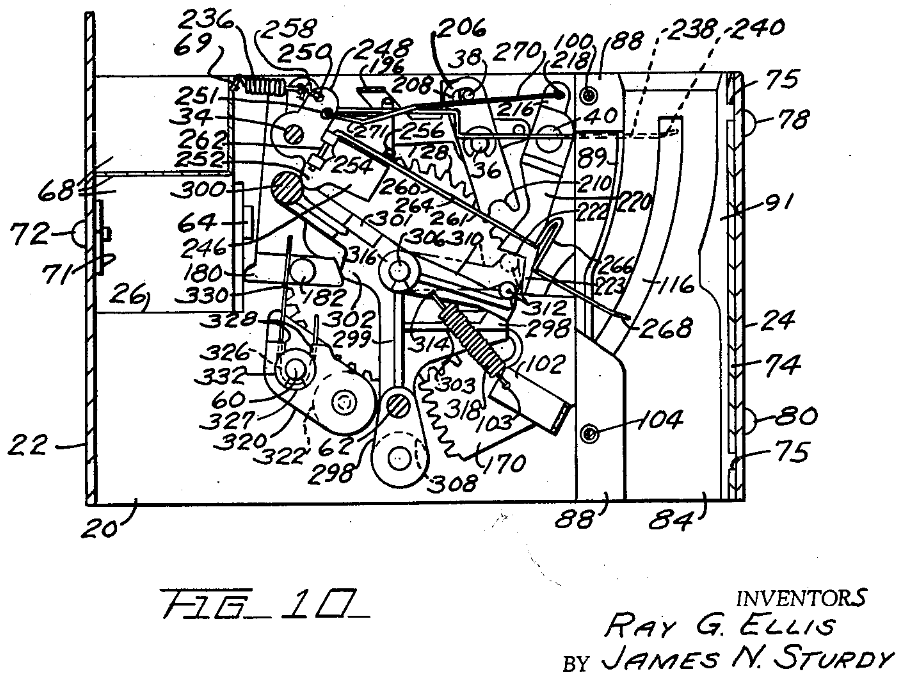
Figure 11:
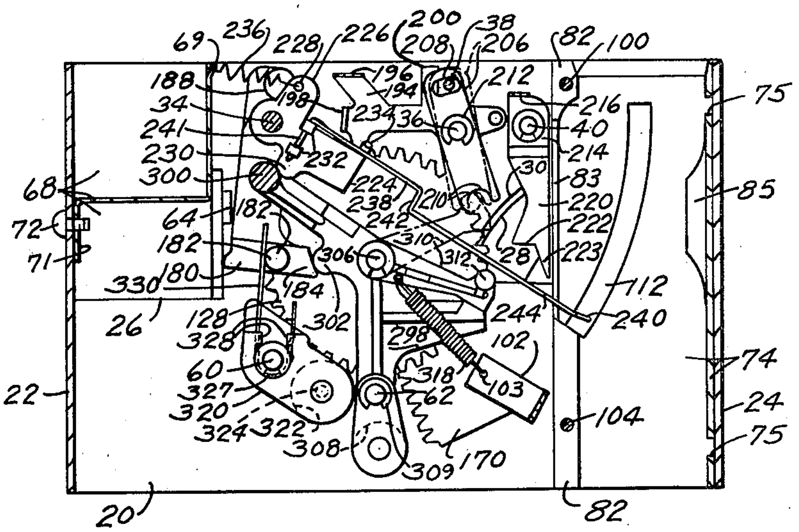
Figure 12:
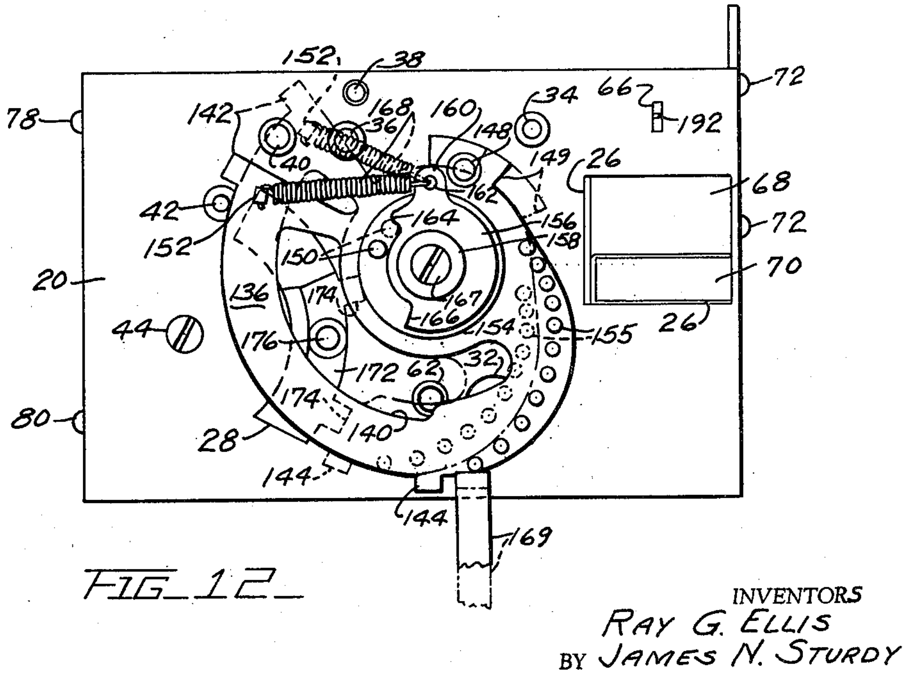
Figure 15:
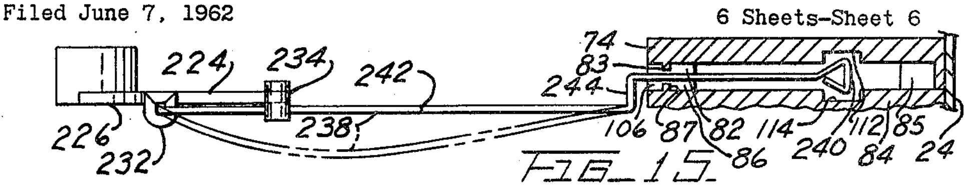
Figures 16, 17:
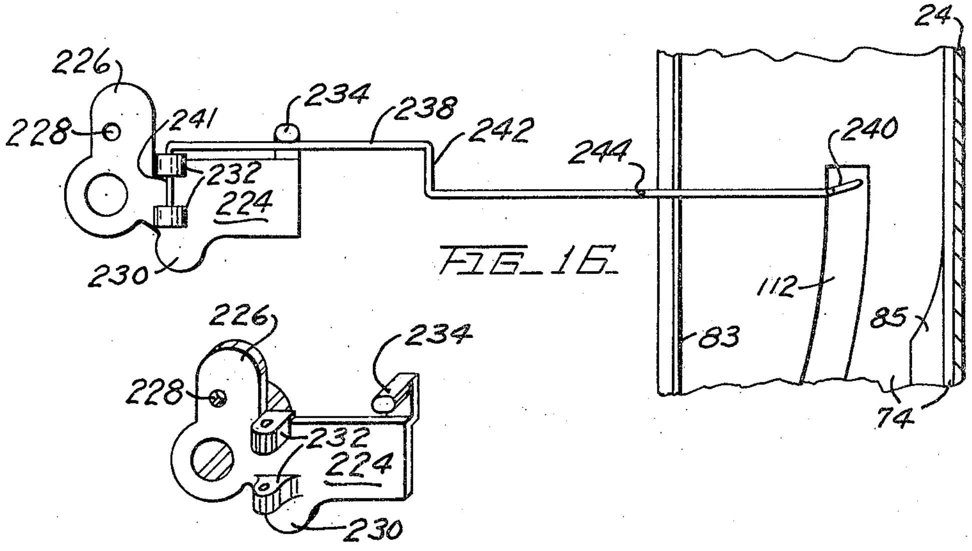
Figure 14:
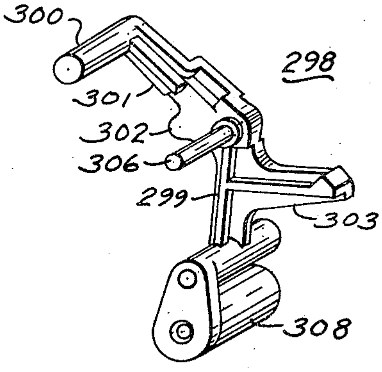

In the drawing,

FIG. 1 is a plan view of one embodiment of coin-handling device that is made in accordance with the principles and teachings of the present invention, FIG. 2 is a front elevational view of the coin-handling device of FIG. 1, FIG. 3 is a rear elevational view of the coin-handling device of FIG. 1, and it shows a feeling bar that is used with the credit-readout of that coin-handling device, FIG. 4 is a sectional view through the coin-handling device of FIG. 1, and it is taken along the plane indicated by the line 4—4 in FIG. 2, FIG. 5 is another sectional view through the coin-handling device of FIG. 1, and it is taken along the broken plane indicated by the broken line 5—5 in FIG. 2, FIG. 6 is a partially broken-away sectional view through the coin-handling device of FIG. 1, and it is taken along the plane indicated by the line 6—6 in FIG. 5, FIG. 7 is a sectional view which is generally similar to FIG. 6, and it emphasizes those components of the coin-handling device of FIG. 1 which are within the circular area indicated by the circular line 7 in FIG. 6, FIG. 8 is a sectional view through a portion of the coin-handling device of FIG. 1, and it is taken along the plane indicated by the line 8—8 in FIG. 2, FIG. 9 is a sectional view through the coin-handling device of FIG. 1, and it is taken along the broken plane indicated by the broken line 9—9 in FIG. 1, FIG. 10 is another sectional view through the coin-handling device of FIG. 1, and it is taken along the broken plane indicated by the broken line 10—10 in FIG. 1, FIG. 11 is a further sectional view through the coin-handling device of FIG. 1, and it is taken along the plane indicated by the line 11—11 in FIG. 1, FIG. 12 is a rear elevational view of the coin-handling device of FIG. 1 and it shows, by dotted lines, an advanced position of the credit-readout of that coin-handling device, FIG. 13 is a sectional plan view through part of the credit-readout, through the ratchet wheel, and through the crank mounted on the sleeve-like extension of that ratchet wheel, FIG. 14 is a perspective view of the transfer plate of the coin-handling device of FIG. 1, FIG. 15 is a partially-sectioned plan view, on a larger scale, showing one of the coin chutes, one of the actuators, and one of the coin-actuated levers of the coin-handling device of FIG. 1, FIG. 16 is a partially-sectioned elevational view of the coin chute, actuator, and coin-actuated lever of FIG. 15, and FIG. 17 is a perspective view of the coin-actuated lever of FIG. 15.

Referring to the drawing in detail, the numeral 20 denotes the center wall of the frame of one embodiment of coin-handling device that is made in accordance with the principles and teachings of the present invention. That frame has a flange 22 at the left-hand side thereof and has a flange 24 at the right-hand side thereof. Those flanges coact with the center wall 20 of that frame to make that frame U-shaped in plan. That frame will preferably be made of metal which is thick enough to make that frame sturdy and rigid.

An opening 26, that is generally square, is formed in the center wall 20 of the frame; and that opening is adjacent the left-hand side of that center wall, as shown by FIG. 2. That opening abuts the flange 22, and that opening is disposed about half-way between the upper and lower edges of the center wall 20 of the frame. An arcuate slot 28 is formed in the center wall 20, and that slot is near the right-hand side of that center wall but is spaced from the flange 24, all as shown by FIG. 2. The configuration of that slot is best shown in FIG. 12. One of the edge of the center wall 20 which defines the slot 28 is denoted by the numeral 30, and that edge will preferably be coined to render it smooth and free of any burrs which might form as the slot 28 is formed. A circular opening 32 is formed in the center wall 20; and that opening is generally intermediate the lower end of the opening 26 and the lower end of the slot 28, as shown by FIG. 3.

The numeral 34 denotes an elongated pivot which has the rear end thereof disposed within an opening in the center wall 20 of the frame, which has a large diameter shoulder abutting the front face of that center wall, and which has a small diameter portion extending forwardly from that shoulder and from that center wall. The rear end of that pivot can be formed as a tubular rivet and can be suitably riveted over to secure that pivot to the center wall 20 of the frame. The numeral 36 denotes a pivot which has the rear end thereof disposed within another opening in the center wall 20 of the frame, which has a large diameter shoulder abutting the front face of that center wall, and which has a small diameter portion extending forwardly from that shoulder and from that center wall. The pivot 34 is disposed to the right of, and above the level of, the opening 26 in the center wall 20, as that center wall is viewed in FIG. 2; and the pivot 36 is disposed to the right of the pivot 34. The rear end of the pivot 36 can be formed as a tubular rivet and can be suitably riveted over to secure that pivot to the center wall 20 of the frame.

A pin 38 has the rear end thereof disposed within a further opening in the center wall 20, has a large diameter shoulder abutting the front face of that center wall, and has a small diameter portion projecting forwardly from that shoulder and from that center wall. The rear end of that pin can be formed as a tubular rivet and can be suitably riveted over to secure that pin to the center wall 20 of the frame. As indicated particularly by FIG. 2, the pin 38 is disposed above the level of, and slightly to the left of, the pivot 36. A pivot 40 has the rear end thereof disposed within yet another opening in the center wall 20 of the frame, has a large diameter shoulder abutting the front face of that center wall, and has a small diameter portion extending forwardly from that shoulder and from that center wall. The rear end of the pivot 40 can be formed as a tubular rivet and can be suitably riveted over to secure that pivot to the center wall 20 of the frame. As indicated particularly by FIG. 2, the pivot 40 is disposed to the right of the pivot 36, and it is disposed above the level of the slot 28.

A pin 42 has the front end thereof disposed within a still further opening in the center wall 20, has a large diameter shoulder abutting the rear face of that center wall, and has a small diameter portion extending rearwardly from that shoulder and from that center wall. As indicated particularly by FIG. 3, that pin is disposed below the level of the pivot 40, and it is horizontally spaced from that pivot.

The numeral 46 denotes a pivot which has the rear end thereof disposed within an additional opening in the center wall 20, which has a large diameter shoulder abutting the front face of that center wall, which has a smaller diameter portion extending forwardly from that shoulder and from that center wall, which has a slot in the forward end of that smaller diameter portion to accommodate the blade of a screw-driver, and which has a threaded recess in the rear end thereof to accommodate the shank of a screw 44. That screw serves to hold that pivot fixedly in position relative to the center wall 20 of the frame. That screw, and hence the pivot 46, is disposed below the level of the pin 42, and it is laterally spaced from that pin, as shown by FIG. 3. The pivot 46 has an annular groove, not shown, adjacent the front end thereof, and that groove can accommodate a C-washer 48, as shown by FIG. 1.

The numeral 50 denotes a loop which is punched inwardly of the flange 24 of the frame, and that loop is shown particularly by FIG. 6. That loop is disposed above the level of, and is laterally displaced from, the pivot 46.

The numeral 52 in FIG. 13 denotes an opening in the center wall 20 of the frame, and that opening is close to the geometric center of that center wall. A sleeve 54, with an annular shoulder at the exterior thereof, has the front end thereof pressed into the opening 52. The shoulder at the exterior of that sleeve abuts the rear face of the center wall 20, and the rear end of that sleeve extends rearwardly from that shoulder and from the rear face of that center wall. The inner and outer faces of the sleeves 54 are smooth so they can be used as bearing surfaces.

The numeral 60 denotes a pivot which has the rear end thereof disposed within an opening in the center wall 20 of the frame, which has a large diameter shoulder abutting the front face of that center wall, and which has a small diameter portion extending forwardly from that shoulder and from that center wall. The rear end of that pivot can be formed as a tubular rivet and can be suitably riveted over to secure that pivot to the center wall 20. A pivot 62 has the rear end thereof disposed within yet another opening in the center wall 20, has a large diameter shoulder abutting the front face of that center wall, and has a small diameter portion extending forwardly from that shoulder and from that center wall. The rear end of that pivot can be formed as a tubular rivet and can be suitably riveted over to secure that pivot on the center wall 20. As indicated particularly by FIG. 2, the pivot 60 is almost directly below the pivot 34; and the pivot 62 is below the level of, and is spaced to the right of, the pivot 60.

An ear 64 is formed on the center wall 20 of the frame adjacent the right-hand side of the opening 26, as that opening is viewed in FIG. 2. That ear can be formed at the time the opening 26 is formed in the center wall 20; and that ear extends forwardly from that center wall. A loop 66 is punched forwardly from the center wall 20 of the frame at a point above the opening 26; and that loop is best shown in FIGS. 1 and 6.

The numeral 68 denotes a coin chute which has an outlet 70 at the lower end thereof; and that coin chute inclines downwardly and rearwardly relative to the center wall 20 and extends through the opening 26 in that center wall. As a result, the outlet 70 of the coin chute 68 opens to the rear of the center wall 20. A perforated lip 69 is provided at one of the upper edges of the coin chute 68, as indicated particularly by FIGS. 1 and 2; and that lip has three openings therein, as shown particularly by FIG. 1. An ear 71 is formed on the coin chute 68, and that ear extends generally forwardly from that coin chute. An ear 73 also is formed on the coin chute 68, and that ear extends generally rearwardly from that coin chute. The ear 71 is shown particularly by FIG. 2, and the ear 73 is shown particularly by FIG. 1. Screws 72 extend through openings in the flange 22 and seat in openings in the ears 71 and 73 to fixedly secure the coin chute 68 to the flange 22 of the frame.

The numeral 74 denotes a bracket which is generally L-shaped in plan, and which is substantially as tall as the frame; and the "foot" of that bracket abuts the inner face of the flange 24, as shown particularly by FIG. 1. Six openings 75 are formed in that "foot," and those openings are grouped in three vertically-alined, horizontally-spaced pairs of openings. Vertically-directed bosses 82 are formed on the front face of the L-shaped bracket 74 as indicated by FIG. 11, and those bosses are adjacent the upper and lower edges of that bracket. A thin and shallow vertically-directed boss 83 extends between and connects the bosses 82, but the front face of that boss is spaced rearwardly of the front faces of the bosses 82. A boss 85 also is formed on the L-shaped bracket 74, and that boss abuts the "foot" of that bracket. That boss is generally in register with the thin and shallow boss 83 on the L-shaped bracket 74. An arcuate recess 112 is formed in the L-shaped bracket 74, and that recess inclines downwardly from upper right to lower left in FIG. 11. The upper edges of the L-shaped bracket 74 and of the upper boss 82 are tapered, as shown particularly by FIGS. 1 and 11.

The numeral 76 denotes a boss which is formed at the rear face of the L-shaped bracket 74, and that boss is adjacent the upper end of that bracket, as shown by FIG. 6. A boss 81 also is formed at the rear face of the L-shaped bracket 74, and that boss is adjacent the lower end of that bracket, as shown by FIG. 6. Screws 78 and 80, respectively, extend through openings in the flange 24 and seat in threaded sockets in the bosses 76 and 81. As a result, those screws fixedly secure the L-shaped bracket 74 to the flange 24 of the frame.

The numeral 84 denotes a flat, generally-rectangular plate which has projections at the right-hand edge thereof; and those projections extend into two of the openings 75 in the "foot" of the L-shaped bracket 74, as shown by FIG. 10. Those projections will coact with those openings to hold the right-hand edge of the rear face of the plate 84 in abutting engagement with the boss 85 on the L-shaped bracket 74. The plate 84 has vertically-directed bosses 86 adjacent the upper and lower ends of the rear face thereof, and those bosses are identical to the bosses 82 on the L-shaped bracket 74. Also, the plate 84 has a thin and shallow vertically-directed boss 87 which extends between and connects the bosses 86; and that thin and shallow boss is identical to the vertically-directed thin and shallow boss 83 on the L-shaped bracket 74. The boss 87 will be in register with, but spaced from, the boss 83; and the bosses 86 will be in register with and will abut the bosses 82 whenever the plate 84 is set in the position indicated by FIG. 1. The plate 84 also has an arcuate recess 114 in the rear face thereof which is complementary to, and in register with, the arcuate recess 112 in the L-shaped bracket 74, as shown by FIG. 8. The plate 84 coacts with the L-shaped bracket 74 to define a coin chute which will accommodate twenty-five cent pieces.

The plate 84 has vertically-directed bosses 88 on the front face thereof, and also has a boss 91 on that front face, as shown by FIG. 10. The bosses 88 are adjacent the upper and lower edges of that plate, and a thin and shallow boss 89 extends between and connects those bosses. As shown by FIG. 10, the upper end of the boss 89 is curved and inclines downwardly from upper right to lower left. An arcuate recess 116 is formed in the front face of the plate 84; and, as indicated particularly by FIG. 8, that recess is horizontally offset from the arcuate recess 114 in the rear face of that plate. As indicated by FIG. 1, the upper edges of the plate 84 are tapered; and the taper at the rear of that plate will coact with the tapered upper edges of the L-shaped bracket 74 to facilitate ready introduction of twenty-five cent pieces into the twenty-five cent chute defined by the plate 84 and that L-shaped bracket.

The numeral 90 denotes a second flat, generally-rectangular plate which has projections at the right-hand edge thereof; and those projections extend into two further openings 75 in the "foot" of the L-shaped bracket 74. Those projections will coact with those openings to hold the rear face of the right-hand portion of the plate 90 in abutting engagement with the boss 91 on the front face of the plate 84. The plate 90 has vertically-directed bosses 92 adjacent the upper and lower ends of the rear face thereof, and those bosses are identical to the bosses 88 on the plate 84. Also, the plate 90 has a thin and shallow boss 93 which extends between and connects the bosses 92; and that thin and shallow boss is identical to the boss 89 on the front face of the plate 84. The bosses 92 will be in register with and will abut the bosses 88, and the thin and shallow boss 93 will be in register with, but will be spaced from, the thin and shallow boss 89 whenever the plate 90 is in the position shown by FIG. 1. The rear face of the plate 90 has an arcuate recess 118 which is complementary to and which is in register with the arcuate recess 116 in the front face of the plate 84. The plate 90 will coact with the plate 84 to define a coin chute which can accept ten cent pieces. The upper edges of the plate 90 are tapered, as shown particularly by FIG. 1, and the taper at the rear face of the plate 90 will coact with the taper at the front face of the plate 84 to facilitate ready introduction of ten cent pieces into the chute for ten cent pieces defined by the plates 84 and 90.

The plate 90 has vertically-directed bosses 94 on the front face thereof, and those bosses are adjacent the upper and lower end of that plate. A thin and shallow boss 95 extends between and connects the bosses 94, as shown by FIG. 9; and that boss is straight. An arcuate recess 120 is formed in the front face of the plate 90, and, as shown particularly by FIG. 8, that recess is generally in register with the recess 118 in the rear face of the plate 90.

The numeral 96 denotes a further flat, generally-rectangular plate which has projections at the right-hand edge thereof, and those projections extend into the last of the openings 75 in the "foot" of the L-shaped bracket 74. Those projections coact with those openings to fix the position of the right-hand edge of the plate 96 relative to the right-hand edge of the plate 90. The plate 96 has vertically-directed bosses 98 adjacent the upper and lower ends of the rear face thereof, and those bosses are identical to the bosses 94 on the front face of the plate 90. Also, the plate 96 has a thin and shallow vertically-directed boss 99 which extends between and connects the bosses 98; and that thin and shallow boss is identical to the thin and shallow vertically-directed boss 95 on the plate 90. When the plate 96 is in the position shown by FIG. 1, the bosses 98 will be in register with and will abut the bosses 94, and the boss 99 will be in register with, but will be spaced from, the boss 95. An arcuate recess 122 is formed in the rear face of the plate 96, and that recess is in register with the recess 120 in the front face of the plate 90. The plate 96 will coact with the plate 90 to define a coin chute which can accept five cent pieces. A taper is formed at the rear face of the upper edge of the plate 96, and that taper will coact with the taper at the upper edge of the plate 90 to facilitate ready introduction of nickels into the coin chute defined by the plates 96 and 90.

Alined openings are provided in the plates 96, 90 and 84, and those openings are alined with threaded openings in the L-shaped bracket 74. Fasteners 100 and 104 extend through the alined openings in the plates 96, 90 and 84 and seat in the threaded openings in the L-shaped bracket 74; and, as a result, those fasteners fixedly secure the plates 96, 90 and 94 to that L-shaped bracket. An elongated bracket 102, which has an offset intermediate the ends thereof, is fixedly secured to the front of the plate 96 by the fastener 104. The rearwardly-offset portion of the bracket 102 extends to the left of the plate 96, as that plate is viewed in FIG. 2; and it has a small opening 103 adjacent the end thereof.

The thin and shallow bosses 83 and 87 coact to define a vertically-directed slot 106 at the left-hand side of the quarter passageway, the thin and shallow bosses 89 and 93 coact to define a vertically-directed slot 108 at the left-hand side of the dime passageway, and the thin and shallow bosses 95 and 99 coact to define a vertically-directed slot 110 at the left-hand side of the nickel passageway. Those slots are shown particularly by FIGS. 5 and 8; and those slots are shorter than, but are generally co-extensive with, the arcuate recesses 112, 114, 116, 118, 120 and 122.

The numeral 128 denotes a ratchel wheel that has a large diameter; and that ratchet wheel has a small diameter spur gear 130 formed at the rear face thereof. Also, that ratchet wheel has a sleeve-like portion 132 which extends rearwardly from the spur gear 130 and which telescopes into the sleeve 54 that is mounted within opening 52 in the center wall 20 of the frame, all as shown by FIG. 13. The ratchet wheel 128 also has a polygonal extension 134 that projects rearwardly from the sleeve-like portion 132; and that polygonal extension projects rearwardly beyond the rear face of the sleeve 54. This means that the ratchet wheel 128 and the spur gear 130 are disposed forwardly of the center wall 20, but that the sleeve-like portion 132 and the polygonal extension 134 are disposed rearwardly of that center wall. The sleeve-like portion 132 and the polygonal extension 134 are hollow, and that polygonal extension has an internal thread.

The numeral 136 denotes a credit-readout which is generally flat and which is generally semi-circular. That credit-readout has a sleeve-like portion 138 that telescopes over the sleeve 54, as shown particularly by FIG. 13. That sleeve-like portion can rotate relative to the sleeve 54, and the sleeve-like portion 132 of the ratchet wheel 128 also can rotate relative to that sleeve. As a result, the credit-readout 136 and the ratchet wheel 128 can rotate relative to each other.

The credit-readout 136 has an arcuate slot 140 therein, and that slot is shown particularly by FIG. 3. An ear 142 is formed on the credit-readout 136, and that ear is normally disposed adjacent the pin 42 which extends rearwardly from the center wall 20 of the frame of the coin-handling device. A second ear 144 is formed on the credit-readout 136, and that ear is spaced from the ear 142 by an angular distance which exceeds one hundred degrees. A weight 148 is secured to a further ear 149 on the credit-readout 136; and that weight extends forwardly from the front face of that credit-readout but terminates short of the center wall 20. That weight tends to make the credit-readout 136 statically balanced with regard to the sleeve 54. A circular shallow boss 154 is provided on the rear face of the credit-readout 136; and that boss is concentric with the sleeve-like portion 138 of that credit-readout. A pin 150 extends rearwardly from the shallow circular boss 154, and that pin is spaced radially outwardly from the sleeve-like portion 138. An ear 152 is formed on the credit-readout 136 adjacent the ear 142, and the ear 152 projects rearwardly to serve as a hook. A number of pins 155 are secured to the credit-readout 136, and those pins extend rearwardly from that credit-readout. Those pins are disposed at different radial distances from the sleeve-like portion 138.

The numeral 156 denotes a crank which is generally semi-circular in elevation. That crank has a reduced-diameter hub-like portion, and the inner surface of that hub-like portion is polygonal in configuration. That inner surface will telescope snugly over the polygonal extension 134 of the ratchet wheel 128; and the engagement of the polygonal inner surface of the hub-like portion of the crank 156 with the polygonal extension 134 of the ratchet wheel 128 will cause that crank and that ratchet wheel to rotate as a unit. The crank 156 has a radially-projecting ear 160 thereon, and an opening 162 is formed in that ear. A radially-directed stop 164 is formed on the crank 156 and a second radially-directed stop 166 is formed on that crank. Those stops are spaced apart an angular distance which exceeds ninety degrees; and those stops are in register with the pin 150 that extends rearwardly from the shallow circular boss 154 on the credit-readout 136.

A screw 167 has the shank thereof telescoped through a washer and extending into the internal thread of the polygonal extension 134 of the ratchet wheel 128. That screw and that washer will coact with that internal thread to hold the crank 156 and the credit-readout 136 in assembled relation with the ratchet wheel 128. The crank 156 will be forced to rotate with the ratchet wheel 128 but the credit-readout 136 will be free to rotate relative to that crank and relative to that ratchet wheel. A helical extension spring 168 has one end thereof hooked around the ear 152 on the credit-readout 136 and has the other end hooked through the opening 162 in the ear 160 on the crank 156. That spring biases the credit-readout 136 for rotation in the clock-wise direction relative to the crank 156 and urges the pin 150 into engagement with the stop 164. However, that spring can yield to permit the crank 156 to rotate in the clockwise direction even though the credit-readout 136 should be held against simultaneous rotation in that direction. As a result, if the credit-readout 136 were ever to be held against clockwise rotation, by the engagement of the feeling bar 169 with one of the pins 155, the crank 156 could rotate a distance slightly greater than ninety degrees and the spring 168 could yield to permit that rotation.

The numeral 170 denotes a toothed segment that is mounted on the pivot 46 for rotation relative to the center wall 20 of the frame. The teeth of that segment are formed to mesh with and drive the teeth of the spur gear 130 on the rear of the ratchet wheel 128. An arcuate projection 172 is formed on the rear face of the toothed segment 170, and that arcuate projection extends rearwardly into the arcuate slot 28 in the center wall 20. Ears 174 project radially outwardly from the arcuate projection 172, and those ears are disposed rearwardly of the center wall 20. Those ears coact with the rest of the toothed segment 170 to help hold the teeth of that toothed segment in register with the teeth of the spur gear 130.

A pin 176 extends rearwardly from the arcuate projection 172, and that pin extends through the slot 140 in the credit-readout 136. That pin can be engaged by the restoring mechanism of the coin-actuated machine with which the coin-handling device of the present invention will be used; and that restoring mechanism will selectively apply downwardly-directed forces to that pin to urge the toothed segment 170 to rotate in the clockwise direction in FIG. 6. A helical extension spring 178 has one end thereof hooked through an opening 179 in the toothed segment 170 and has the other end thereof hooked through the loop 50 on the flange 24, as shown by FIG. 6. That spring biases the toothed segment 170 for movement in the upward direction; and it will act through that toothed segment and the spur gear 130 to bias the ratchet wheel 128 for rotation in the counter-clockwise direction in FIG. 2.

The numeral 180 denotes a pawl that is rotatably mounted on the pivot 34; and that pawl is generally L-shaped in elevation, as shown by FIG. 2. That pawl has a pin-like projection 182 thereon, and that projection extends forwardly from the lower portion of that pawl. The pawl 180 also has an inclined face 184 on the lower portion thereof, and that face inclines downwardly from upper left to lower right in FIG. 2. An opening 186 is provided in the upper end of the pawl 180, and a weight 188 to secured to that pawl adjacent that opening. The weight 188 is disposed above the level of the pivot 34, and it extends forwardly from the pawl 180. An ear 190 is formed on the rear face of the pawl 180 adjacent the bottom of that pawl, and that ear has a pointed leading edge so it can readily move into the spaces between adjacent teeth on the ratchet wheel 128. A helical extension spring 192 has one end thereof hooked through the opening 186 in the pawl 180 and has the other end thereof hooked through the loop 66 that is formed on the center wall 20. That spring biases the pawl 180 for rotation in the counter-clockwise direction in FIG. 2, and thus biases the ear 190 on that pawl into position to block counter-clockwise rotation of the ratchet wheel 128 in FIG. 2.

The numeral 206 denotes a stop which has the hub thereof rotatably mounted on the pivot 36. That stop is substantially straight, as shown by FIG. 2; and the upper end of that lever extends upwardly from the pivot 36. That upper end has a slot 208 therein, and that slot extends transversely of the long axis of the stop 206. That slot telescopes over the pin 38, and it will coact with that slot to establish limits for the rotation of the stop 206. The lower end of the stop 206 extends downwardly from the pivot 36, and it has a notch 210 therein. That notch is formed so it has a rounded generally V-shape configuration. A C-washer 212 can be held by an annular groove formed adjacent the forward end of the pivot 36.

The numeral 214 denotes a second stop; and that stop has the hub thereof rotatably mounted on the pivot 40. That stop is generally vertically-directed, as shown by FIG. 2, and it has an ear 216 which extends forwardly from the upper end thereof. That ear is then bent upwardly in the vertical direction; and the upwardly-bent portion of that ear has a generally horizontally-directed slot 218 therein. As indicated by FIG. 1, the ear 216 on the stop 214 extends forwardly a distance which disposes the upwardly-bent forward end of that ear a short distance rearwardly of the plane of the plate 96. The stop 214 has a forwardly-offset downwardly-depending leg 220; and a generally horizontally-directed abutment 222 is formed on the bottom of that leg. A generally vertically-directed finger 223 extends downwardly from that abutment; and, as indicated by FIG. 2, the finger 223 inclines slightly from upper left to lower right.

The numeral 194 denotes a third stop; and that stop has the hub thereof rotatably mounted on the pivot 36. That stop is mounted between the stop 206 and the center wall 20, and it is shown particularly by FIG. 7. That third stop has an ear 196 which extends forwardly at right angles from the plane of that stop; and, as shown particularly by FIG. 1, the ear 196 is quite long and extends almost as far from the center wall 20 as does the pivot 34. A second ear 198 is formed on the stop 190, and that ear also extends forwardly at right angles from the plane of that stop. The ear 198 is disposed and dimensioned so it can move into the spaces between adjacent teeth on the ratchet wheel 128. The ear 198 is quite short—having the forward edge thereof terminating at about the plane of the forward face of the ratchet wheel 128. An ear 200 is formed on the stop 194, and that ear projects upwardly at about ninety degrees from the upper edge of that stop. The ear 200 is disposed adjacent the pin 38, and it will coact with that pin to limit rotation of that stop in the counter-clockwise direction in FIGS. 6 and 7. An opening 202 is formed in the stop 194, and that opening accommodates one end of a helical extension spring 204. The other end of that spring is hooked around the pin 38; and hence that spring will bias the stop 194 for rotation in the clockwise direction in FIGS. 6 and 7. However, that spring can yield to permit rotation of that lever in the counter-clockwise direction.

The numeral 224 denotes a coin-operated lever which has the hub thereof telescoped over the pivot 34; and the hub of that lever will abut the hub of the pawl 180. The lever 224 is best shown in FIG. 11; and it has an ear 226 which extends upwardly above the level of the pivot 34, and an opening 228 is formed in that ear. An ear 230 is also provided on the lever 224, and that ear extends downwardly below the level of the pivot 34; and that ear is disposed to the right of the ear 226. Two short ears 232 project forwardly from the front face of the lever 224, and those ears have openings therein that are in alinement with each other. Those ears are generally in vertical registry with the ear 230. A further ear 234 extends forwardly from the lever 224 adjacent the right-hand end of the upper edge of that lever. A helical extension spring 236 has one end thereof hooked through the opening 228 in the ear 226 of the lever 224 and has the other end thereof hooked through one of the three openings in the inclined lip 69 at the upper end of the coin chute 68; and that spring biases that lever for rotation in the counter-clockwise direction in FIG. 11.

The numeral 238 denotes the actuator for the lever 224, and that actuator is shown as an elongated stiff wire. That actuator has a generally triangular coin-receiving portion 240 at the right-hand end thereof which is disposed within the quarter chute defined by the L-shaped bracket 74 and the plate 84. Two of the apices of the triangular coin-receiving portion 240 will extend into the arcuate recesses 112 and 114 in the confronting faces of the L-shaped bracket 74 and the plate 84. The left-hand end of the actuator 238 is denoted by the numeral 241, and that left-hand end is bent downwardly at right angles to the adjacent portion of that actuator. A downwardly-directed offset 242 is provided in the actuator 238, and that offset is disposed to the right of the right-hand end of the lever 224. A rearwardly-directed offset 244 is provided in the actuator 238 adjacent the slot 106 of the quarter chute. The left-hand end 241 of the actuator 238 extends into and is held by the openings in the ears 232 on the lever 224, and the ear 234 on that lever overlies that actuator. The ears 232 will keep that actuator from shifting downwardly relative to the lever 224; and the ear 234 will keep that actuator from shifting upwardly relative to that lever, as long as that actuator extends generally parallel to the plane of that lever. The right-hand end of the actuator 238 will extend loosely through the slot 106, and the thin and shallow bosses 83 and 87 which define that slot will make sure that the said actuator normally parallels the said lever.

The numeral 246 denotes a second coin-operated lever which has the hub thereof telescoped over the pivot 34; and the hub of that lever will abut the hub of the lever 224. The lever 246 is shown particularly by FIG. 10;

and that lever has an ear 248 extending upwardly above the level of the pivot 34, and an opening 250 is provided in that ear. A second opening 251 also is provided in that ear, and the opening 251 is disposed to the right of the opening 250. An ear 252 on the lever 246 extends downwardly from the lower edge of that lever, and that ear is disposed to the right of the ear 248. Two short ears 254 project forwardly from the front face of the lever 246, and those ears have openings therein which are in alinement with each other. Those ears are generally in vertical registry with the ear 252. A further ear 256 extends forwardly from the lever 246 adjacent the right-hand end of the upper edge of that lever. The lever 246 is substantially identical to the lever 224—the only difference between those levers being the provision of a second opening in the upper ear of the lever 246. A helical extension spring 258 has one end thereof hooked through the opening 250 in the ear 248 of lever 246 and has the other end thereof hooked through a second opening in the inclined lip 69 at the upper edge of the coin chute 68. That spring biases the lever 246 for rotation in the counter-clockwise direction in FIG. 10; but it can yield to permit rotation of that lever in the clockwise direction.

The numeral 260 denotes the actuator for the lever 246, and that actuator is shown as an elongated stiff wire. That actuator has a generally triangular coin-receiving portion 268 at the right-hand end thereof which is disposed within the dime chute defined by the plates 84 and 90. Two of the apices of the triangular coin-receiving portion 268 will extend into the arcuate recesses 116 and 118 in the confronting faces of the plates 84 and 90. The left-hand end of the actuator 260 is denoted by the numeral 262, and that left-hand end is bent downwardly at right angles to the adjacent portion of that actuator. A rearwardly-directed offset 264 is provided in the actuator 260, and a re-entrant bend 266 also is provided in that actuator. That re-entrant bend is adjacent the slot 108 of the dime chute which is defined by the plates 84 and 90. The left-hand end 262 of the actuator 260 extends into and is held by the openings in the ears 254 on the lever 246, and the ear 256 on that lever overlies that actuator. The ears 254 will keep that actuator from shifting downwardly relative to the lever 246, and the ear 256 will keep that actuator from shifting upwardly relative to that lever, as long as that actuator extends generally parallel to the plane of that lever. The right-hand end of the actuator 260 will extend loosely through the slot 108, and the thin and shallow bosses 89 and 93 which define that slot will make sure that the said actuator normally parallels the said lever.

Whenever the lever 246 responds to the spring 258 to move to its upper position, the re-entrant bend 266 in the actuator 260 will be immediately adjacent the right-hand edge of the ear 216 on the stop 214. However, whenever the actuator 260 and lever 246 are in the lower positions indicated by FIG. 10, that re-entrant bend will be out of the path of that ear. This means that as long as the lever 246 and its actuator 260 are in their upper positions, the re-entrant bend 266 will block rotation of the stop 214 in the clockwise direction in FIG. 10; but that after that lever and its actuator have moved down out of their upper positions, that stop will be freed to rotate in that direction.

A connector 270, which is shown in the form of an elongated stiff wire, has one end thereof hooked through the opening 251 in the ear 248 on the lever 246. The other end of that connector is hooked through the slot 218 in the upper end of the stop 214; and that connection is dimensioned so that other end abuts the left-hand end of the slot 218 whenever the lever 246 and the actuator 260 are in their upper positions. The connector 270 has a shallow, downwardly-directed re-entrant bend 271; and that bend is adjacent the forwardly-extending ear 196 on the stop 194 and will thus provide full clearance between that ear and the connector 270.

The numeral 272 denotes a third coin-operated lever that has the hub thereof mounted on the pivot 34; and the hub of that lever will abut the hub of the lever 246. The lever 272 is best shown in FIG. 9; and that lever has an ear 274 which extends upwardly above the level of the pivot 34, and that ear has an opening 278 therein. A second ear 276 extends upwardly from the lever 272, but that ear is adjacent the right-hand end of the upper edge of that lever. An ear 280 extends downwardly from the lower edge of the lever 272, and that ear is disposed intermediate the ears 274 and 276. Two short ears 282 project forwardly from the front face of the lever 272, and those ears have openings therein which are in alinement with each other. Those ears are generally in vertical registry with the ear 280. A further ear 284 extends forwardly from the lever 272 adjacent the right-hand end of the upper edge of that lever. The lever 272 is similar to the levers 224 and 246, but it has the ear 276 which those other two levers do not have. That ear has the front face thereof coplanar with the rear face of the lever 272 so that it will not interfere with the actuator 288 for the lever 272. A helical extension spring 286 has one end thereof hooked through the opening 278 in the ear 274 and has the other end thereof hooked through the third opening in the inclined lip 69 of the coin chute 68. That spring biases the lever 272 for counter clockwise rotation relative to the pivot 34 in FIG. 9, but it can yield to permit clockwise rotation of that lever relative to that pivot.

The actuator 288 for the lever 272 is shown as an elongated stiff wire. That actuator has a generally triangular coin-receiving portion 296 at the right-hand end thereof which is disposed within the nickel chute defined by the plates 90 and 96. Two of the apices of the triangular coin-receiving portion 296 will extend into the arcuate recesses 120 and 122 in the confronting faces of the plates 90 and 96. The left-hand end of the actuator 288 is denoted by the numeral 290, and that left-hand end is bent downwardly at right angles to the adjacent portion of that actuator. That actuator has a downwardly-directed offset 292 therein, and also has a rearwardly-directed offset 294 therein. The offset 294 is adjacent the slot 110 at the left-hand side of the nickel chute. A C-washer 297 is seated in an annular groove in the pivot 34 adjacent the forward end of that pivot; and that C-washer prevents accidental separation of the pawl 180 and of the levers 224, 246 and 272 from that pivot.

The left-hand end 290 of the actuator 288 extends into and is held by the openings in the ears 282 on the lever 272, and the ear 284 on that lever overlies that actuator. The ears 282 will keep that actuator from shifting downwardly relative to the lever 272; and the ear 284 will keep that actuator from shifting upwardly relative to that lever, as long as that actuator extends generally parallel to the plane of that lever. The right-hand end of the actuator 288 will extend loosely through the slot 110, and the thin and shallow bosses 95 and 99 which define that slot will make sure that the said actuator normally parallels the said actuator.

The numeral 298 denotes a transfer plate which has the hub thereof telescoped over the pivot 62, and that transfer plate is shown particularly by FIG. 14. That transfer plate has an arm 299 that extends upwardly from the pivot 62, and a second arm 301 inclines upwardly and to the left from the upper end of the arm 299, as shown particularly by FIG. 14. An elongated pin 300 extends forwardly from the upper end of the arm 301; and that pin is adjacent the ears 230, 252 and 280, respectively, of the levers 224, 246 and 272. Those ears will engage that pin whenever those levers rotate in the clockwise direction in FIGS. 11, 10 and 9. A third arm 303 extends to the right from the arm 299, and those two arms are generally at right angles to each other. An ear 302 is formed adjacent the junction of the arms 299 and 301 and that ear extends to the left from the arm 299. That ear is in register with the inclined face 184 on the pawl 180; and that ear will engage that inclined face and rotate that pawl in the clockwise direction whenever the transfer plate 298 rotates in the counter clockwise direction about the pivot 62. The inclined face 184 will, on the other hand, act against the ear 302 to urge the transfer plate 298 to rotate in the clockwise direction about the pivot 62 whenever the pawl 180 responds to the spring 192 to rotate in the counter clockwise direction in FIG. 2. A pivot 306 is mounted on, and extends forwardly from, the transfer plate 298; and that pivot is disposed adjacent the junction of the arms 299 and 301. A counterweight 308 is secured to the lower end of the transfer plate 298; and that counterweight extends rearwardly from the rear face of that transfer plate but stops short of the center wall 20.

The numeral 310 denotes an advancing pawl which has the left-hand end thereof rotatably mounted on the pivot 306. A C-washer 316 is seated in an annular groove adjacent the forward end of the pivot 306, and that C-washer prevents accidental separation of the pawl 310 from the transfer plate 298. The right-hand end of the pawl 310 has a pin 312 thereon, and that pin extends forwardly from that lever. That pawl also has an ear 304 at the rear face thereof, and that ear is dimensioned to extend into the spaces between adjacent teeth of the ratchet wheel 128; and that ear is best shown in FIGS. 6 and 7. The pawl 310 has an opening 314 therein, and a helical extension spring 318 has one end thereof hooked through that opening and has the other end thereof hooked through the opening 103 in the bracket 102. That spring biases the pawl 310 for rotation in the clockwise direction in FIG. 2, and thus urges the right-hand end of that pawl down into engagement with the right-hand end of the arm 303 of the transfer plate 298. However, that spring can yield to permit that pawl to rotate in the counter clockwise direction. A C-washer 309 is seated in an annular groove adjacent the forward end of the pivot 62. and that C-washer prevents accidental separation of the transfer plate 298 from that pivot.

The numeral 320 denotes a lever which has the hub 327 thereof telescoped over the pivot 60; and that lever has a weight 322 secured thereto. The weight 322 has a small diameter pin 324 formed at the rear face thereof, and that pin extends rearwardly through the opening 32 in the center wall 20. The diameter of the opening 32 is considerably larger than the diameter of the pin 324, and hence the lever 320 can rotate freely relative to the center wall 20. However, the pin 324 can engage the edges of the opening 32 and thereby prevent unlimited oscillation or rotation of the lever 320. A generally U-shaped recess 326 is formed in the front face of the lever 320, and the hub 327 of that lever extends forwardly through that recess. As a result, that hub and that recess define a generally U-shaped recess which can accommodate a generally J-shaped arm 330, which is shown as a stiff wire. Ears 328 are formed on the lever 320, and those ears overlie that U-shaped recess; thereby helping to hold the J-shaped arm 330 in position within that recess. A C-washer 332 is seated in an annular groove adjacent the forward end of the pivot 60, and that C-washer prevents accidental separation of the lever 320 from the pivot 60. Also, that C-washer helps prevent accidental separation of the J-shaped arm 330 from the U-shaped recess in the lever 320.

In assemblying the actuators 238, 260 and 288 with the L-shaped bracket 74 and the plates 84, 90 and 96 which coact to define the quarter, dime and nickel chutes, the actuator 238 can be secured to the lever 224 and one of the apices of the triangular coin-receiving portion 240 of that actuator can be disposed within the arcuate recess 112, and then the plate 84 can be set in engagement with the L-shaped bracket 74. Thereafter, the actuator 260 can be assembled with the lever 246 and one of the apices of the triangular coin-receiving portion 268 of that actuator can be set in the arcuate recess 116, and then the plate 90 can be disposed adjacent the plate 84. At this time, the actuator 288 can be assembled with the lever 272 and the triangular coin-receiving portion 296 can have one of the apices thereof disposed within the arcuate recess 120, and then the plate 96 can be set in engagement with the plate 90. Thereupon, the fasteners 100 and 104 can be used to hold those plates in assembled relation with each other and with the L-shaped bracket 74.

If desired, however, the plates 84, 90 and 96 can be assembled with each other and with the L-shaped bracket 74; and thereafter the actuators 238, 260 and 288 can be assembled with the coin chutes defined by those plates and that bracket. Specifically, the actuator 238 can, prior to the time it is assembled with the lever 224, be rotated approximately ninety degrees about its long axis so the triangular coin-receiving portion 240 thereof is generally vertically-directed and can readily extend through the slot 106. After that generally-triangular coin-receiving portion has been moved through that slot and into register with the arcuate recesses 112 and 114, that actuator can be rotated to the position shown by FIG. 11. At such time, that actuator can be bowed in the manner indicated by FIG. 15, so the left-hand end 241 thereof is in alinement with the two short ears 232 on the lever 224 and so the portion that is intended to underlie the ear 234 is bowed clear of that ear. This means that the left-hand end 241 of that actuator can be telescoped down into the alined opening in the ears 232; and, further, that when the force which caused the bowing of that actuator is released the said actuator will move into position under the ear 234.

Thereafter, the actuators 260 and 288 can, respectively, be rotated ninety degrees about their long axes to permit the triangular coin-receiving portions 268 and 296 thereof to be telescoped through the slots 108 and 110; and then the left-hand ends 262 and 290 of those actuators can be alined with the openings defined by the ears 254 and 282. Those actuators will then be bowed, in the manner in which the actuator 238 was bowed in FIG. 15, to enable those actuators to clear the ears 256 and 284 until the left-hand ends 262 and 290 of those actuators have been seated in the openings defined by the short ears 254 and 282. Thereafter, the forces which were used to bow those actuators will be released, and those actuators will then move into position beneath the ears 256 and 284.

The ears 232 and 234 on the lever 224, and the corresponding ears on the levers 246 and 272, thus facilitate ready and easy assembling of the actuators 238, 260 and 288 with those levers and with the coin chutes. As a result, it is possible to assemble the plates that define the coin chutes and then associate the actuators with those coin chutes.

The ears 232 and 234 on the lever 224, and the corresponding ears on the levers 246 and 272, perform a very important function in permitting those actuators to rotate freely about the axes of the alined openings in the pairs of short ears 232, 254 and 282; because that rotation will permit the right-hand ends of those actuators to move forwardly and rearwardly relative to the center wall 20. This is extremely desirable because it eliminates any binding or sticking of those actuators against the coin chutes. Any tendency of the actuators to bind or stick is additionally minimized by the provision of the thin and shallow bosses 83 and 87, 89 and 93, and 95 and 99. Those bosses minimize the areas of possible engagement between the coin-receiving actuators and the L-shaped bracket 74 and the plates 84, 90 and 96 which define the coin chutes. Furthermore it will be noted the apices of the triangular coin-receiving portions 240, 268 and 296 which are, respectively, adjacent the arcuate recesses 112 and 114, 116 and 118, and 120 and 122, are smoothly rounded. Hence, those apices will not tend to bind or stick against the walls of those recesses. The overall result is that the present invention provides a coin-handling device wherein binding and sticking of the actuators is practically eliminated.

The initial positions of the component parts of the coin-handling device of the present invention are shown in FIGS. 2 and 3. The toothed segment 170 will be in its lower position and will have the arcuate projection 172 thereof abutting the lower end of the slot 28; and that segment will thus act through the spur gear 130 on the ratchet wheel 128 to hold the crank 156 so the stop 166 thereon is generally vertical. The spring 178 will be urging the toothed segment 170 upwardly, and that toothed segment will be acting through the spur gear 130 to urge the ratchet wheel 128 to rotate in the counter clockwise direction in FIG. 2. The spring 168 will be urging the pin 150 on the credit-readout 136 against the stop 164 on the crank 156; and the feeling bar 169 will have the upper end thereof disposed below the level of the lowermost pin 155. The spring 192 will cause the pawl 180 to hold the ear 190 thereon in the space between two adjacent teeth on the ratchet wheel 128, and will thereby cause that pawl to hold that ratchet wheel against rotation in the counter clockwise direction in FIG. 2. The weight 322 on the lever 320 will be urging the arm 330 against the pin-like projection 182 on the pawl 180, and will thus be helping the spring 192 to urge the ear 190 into the space between adjacent teeth on the ratchet wheel 128.

The springs 236, 258 and 286 will be holding the levers 224, 246 and 272 in their upper positions, and will thus be holding the free ends of the actuators 238, 260 and 288 adjacent the upper ends of the slots 106, 108 and 110. The ear 276 on the lever 272 will be holding the stop 194 in its upper position, and will thus be holding the ear 198 on that stop out of the path of the teeth on the ratchet wheel 128.

The spring 318 will be urging the pawl 310 downwardly against the arm 303 of the transfer plate 298, and will also be urging that transfer plate for rotation in the clockwise direction about the pivot 62. As a result, the pin 300 on the arm 301 of that transfer plate will be engaging one or more of the ears 230, 252 and 280, respectively, of the levers 224, 246 and 272. The force which is applied to the levers 224, 246, and 272 by the pin 300 will add to the forces which are applied to those levers by the springs 236, 258 and 286. Two of the apices of the triangular coin-receiving portion 240 of the actuator 238 will extend into the arcuate recesses 112 and 114, but will not simultaneously engage both of those recesses and may not engage either of those recesses. Similarly, two of the apices of the triangular coin-receiving portion 268 of the actuator 260 will extend into the arcuate recesses 116 and 118, but will not simultaneously engage both of those recesses and may not engage either of those recesses. Further, two of the apices of the triangular coin-receiving portion 296 of the actuator 288 will extend into the arcuate recesses 120 and 122, but will not simultaneously engage both of those recesses and may not engage either of those recesses.

Because the lever 246 is in its upper position, the reentrant bend 266 on the actuator 260 will be immediately adjacent the right-hand edge of the ear 216 on the stop 214, and that bend will be holding that stop so it is vertically-directed. Also, because the lever 246 is in its upper position, the connector 270 will have the right-hand end thereof adjacent the left-hand end of the slot 218 in the upwardly-bent forward end of the ear 216. Because the stop 214 is held vertically-directed, the abutment 222 on that stop will be out of the path of the pin 312 on the advancing pawl 310. The stop 206 will be in the position shown by FIG. 2, and will thus have the notch 210 in the lower end thereof in register with the pin 312 on the advancing pawl 310. The spring 204 will be urging the stop 194 for rotation from the raised position in FIG. 6 to the lowered position in FIG. 7 but, as described hereinbefore, the ear 276 on the lever 272 will hold that stop in its raised position.

The coin-handling device of the present invention will be mounted adjacent the bottom of a multi-coin slug rejector, and the quarter, dime and nickel chutes of that coin-handling device will be set in precise registry with the quarter, dime and nickel exits of that slug rejector. Also, the coin chute 68 will be set in register with the respected coin chute of the slug rejector. As a result, any slugs or coins that are rejected by, or that are scavenged from, the slug rejector will pass downwardly to the coin chute 68 and will be directed rearwardly through the opening 26 in the center wall 20; and then they will be permitted to fall into a conduit which will conduct them to a cup-like coin receptacle at the exterior of the coin-actuated machine with which the coin-handling device of the present invention is used.

If a patron inserts a nickel in that coin-actuated machine, that nickel will pass downwardly through the slug repector and enter the nickel chute defined by the plates 90 and 96. That nickel will engage the triangular coin-receiving portion 296 of the actuator and will force that actuator to move from its generally-horizontal initial position to the downwardly-inclined position shown by FIG. 9; and, as that actuator moves downwardly, it will cause the lever 272 to rotate in the clockwise direction. The resulting downward movement of the ear 276 will permit the stop 194 to start the ear 198 thereon moving downwardly toward the ratchet wheel 128, and the simultaneous downward movement of the ear 280 will cause that ear to engage the pin 300 on the arm 301 of the transfer plate 298 and start moving that pin to the left. As a result, the transfer plate 298 will start moving in the counter clockwise direction as the stop 194 starts moving its ear 198 downwardly toward the teeth of the ratchet wheel 128.

The counter clockwise rotation of the transfer plate 298 will cause the ear 302 on that transfer plate to engage the inclined face 184 on the pawl 180 and thereby start moving the ear 190 on that pawl out of the path of the teeth on the ratchet wheel 128. Shortly after the ear 198 on the stop 194 as moved into the space between two adjacent teeth on the ratchet wheel 128, the ear 190 on the pawl 180 will move out of the path of the teeth on that ratchet wheel; and, thereupon, that ratchet wheel will respond to the spring 178 and the toothed segment 170 to rotate in the counter clockwise direction in FIG. 2 an angular distance approximately equal to one-half of the width of one of the teeth on that ratchet wheel. The counter clockwise rotation of that ratchet wheel will be halted by the engagement of one of the teeth on that ratchet wheel with the ear 198 on the stop 194.

As the transfer plate 298 rotates in the counter clockwise direction, it will cause the pivot 306 to pull the ear 304 on the pawl 310 into the space between two further teeth on the ratchet wheel 128. As a result, when that ratchet wheel rotates, it will cause the advancing pawl 310 to rotate with it; but the advancement of the pawl 310 is not significant when a nickel is inserted.

The nickel will cause the actuator 288 to move down toward the lower ends of the arcuate recesses 120 and 122, and then that nickel will move beyond the triangular coin-receiving portion 296 and pass downwardly through the nickel chute to a conduit which will conduct it to the cash box of the coin-actuated machine. Thereafter, the spring 286 will restore the lever 272 to its upper position and will restore the actuator 288 to its upper position. As the lever 272 moves back toward its upper position, it will permit the spring 318 to urge the transfer plate 298 to rotate in the clockwise direction about the pivot 62; and that rotation will tend to move the ear 304 on the pawl 310 out of engagement with the teeth on the ratchet wheel 128. Also that rotation of that transfer plate will tend to move the ear 302 out of engagement with the inclined face 184 on the pawl 180; and thereupon the spring 192 and the weighted lever 320 will urge the ear 190 on that pawl into engagement with the space between the tooth which originally engaged that ear and the next succeeding tooth. In addition, the rotation of the lever 272 will move the ear 276 thereon upwardly toward the ear 196 on the stop 194 and tend to raise that stop. Shortly before the ear 276 on the lever 272 raises the ear 196 on the stop 194 far enough to cause the ear 198 on that stop to move out of the path of the teeth on the ratchet wheel 128, the ear 190 on the pawl 180 will move into the path of other teeth on that ratchet wheel. As a result, when lever 272 moves back up into its upper position, the ratchet wheel 128 will be freed by the ear 198 on the stop 194 and will then be intercepted and held by the ear 190 on the pawl 180. As the ear 198 frees that ratchet wheel and the ear 190 then intercepts and holds that ratchet wheel, that ratchet wheel will rotate in the counter clockwise direction in FIG. 2 an additional angular distance approximately equal to one-half of the width of a tooth on that ratchet wheel.

The overall result is that the insertion of a nickel will have caused the ratchet wheel 128 to advance in the counter clockwise direction an angular distance approximately equal to the width of one of the teeth on that ratchet wheel. The crank 156 also will rotate an angular distance approximately equal to the width of one of the teeth on the ratchet wheel 128, but that crank will have moved in the clockwise direction in FIG. 3. Since the feeling bar 169 was below the level of the pins 155 on the credit-readout 136, the spring 168 caused that credit-readout to rotate an angular distance equal to the width of one of the teeth on the ratchet wheel 128.

If a nickel is all that the patron intends to insert, he will then actuate a button or lever at the exterior of the coin-actuated machine and thereby cause the feeling bar 169 to move upwardly toward the pins 155 on the credit-readout 136. Because that credit-readout advanced a distance corresponding to the width of one of the teeth on the ratchet wheel 128, the feeling bar 169 will be able to move up further than it could have moved when the credit-readout 136 was in its normal position. That further movement will enable the coin-actuated machine to initiate one of its cycles of operation; and, during that cycle of operation, the desired product, commodity or service will be dispensed, and either a lever or an electromagnetic device will cause a downward force to be applied to the pin 176 on the toothed segment 170. That downward force will enable that toothed segment to urge the spur gear 130 and the ratchet wheel 128 to rotate in the clockwise direction in FIG. 2; and one tooth on that ratchet wheel will apply upwardly-directed forces to the ear 190 on the pawl 180. The lower face of that ear is inclined to that radius of the ratchet wheel 128 which extends through that tooth, and hence that lower face will serve as an inclined plane and will urge the ear 190 out of the path of the teeth on that ratchet wheel. As a result, the ratchet wheel 128 will be able to rotate back to its initial position. The overall result is that at the end of the cycle of the coin-actuated machine, the component parts of the coin-handling device of the present invention will have been restored to their initial positions.

If a dime is inserted, that dime will pass through the slug rejector and will be directed to the dime chute which is defined by the plates 84 and 90. As that dime moves downwardly through that chute, it will engage the triangular coin-receiving portion 268 of the actuator 260 and will subsequently engage the boss 91. That boss will guide that dime to the left in FIG. 10, and will thus force that dime to follow the triangular coin-receiving portion 268. As that dime causes the actuator 260 to move downwardly, the re-entrant bend 266 in that actuator will move downwardly below the level of the ear 216 on the stop 214; and this means that the stop 214 will be free to rotate in the clockwise direction from the position of FIG. 2 to the position of FIG. 10. That stop will be rotated in that direction by the connector 270, which extends between the opening 251 in the ear 248 and the slot 218 in the upturned forward end of the ear 216 of the stop 214, as the lever 246 continues to rotate in the clockwise direction. As a result, the abutment 222 on the lower end of the stop 214, which normally is out of the path of the pin 312 on the pawl 310, as shown by FIG. 2, will be shifted into the path of that pin, as shown by FIG. 10.

As the actuator 260 continues to move downwardly, and thus causes the lever 246 to act through the connector 270 to cause the stop 214 to rotate in the clockwise direction, the ear 252 on the lever 246 will act against the pin 300 on the transfer plate 298—thereby causing that transfer plate to rotate in the counter clockwise direction about the pivot 62. That rotation will cause the ear 302 on that transfer plate to engage the inclined surface 184 on the pawl 180 and start moving the ear 190 on that pawl outwardly relative to the teeth on the ratchet wheel 128, and that rotation will also start moving the ear 304 on the advancing pawl 310 inwardly of the teeth on that ratchet wheel. Shortly after the lever 246 has rotated far enough to cause the connector 270 to rotate the stop 214 into the position shown by FIG. 10, the ear 304 on the pawl 310 will have moved between two adjacent teeth on the ratchet wheel 128; and, thereafter, as the actuator 260 continues to move downwardly, the ear 190 on the pawl 180 will be moved out of the path of the teeth on that ratchet wheel. Thereupon that ratchet wheel will be free to move in the counter clockwise direction in FIG. 2; and, as that ratchet wheel so moves, the pawl 310 will move with it, because the ear 304 on that pawl will be disposed between two adjacent teeth on that ratchet wheel. As that pawl rotates with the ratchet wheel 128, the pin 312 thereon will engage and be held by the abutment 322 on the stop 314; but that pawl and that ratchet wheel will rotate an angular distance approximately equal to the widths of one and one-half teeth on the ratchet wheel 128 before the pin 312 engages the abutment 322.

The dime will continue to move the actuator 260 downwardly until that dime can pass beyond the triangular coin-receiving portion 268 of that actuator; and thereupon that dime will pass downwardly out of the dime chute and will pass to the cash box of the coin-actuated machine. Thereafter, the restorative forces within the spring 258 will cause the lever 246 to move back to its normal upper position. As that lever moves back toward that position, the ear 252 thereon will permit the pin 300 on the transfer plate 298 to start moving to the right, and the opening 251 in the ear 248 on that lever will start pulling the connector 270 to the left. The movement of the pin 300 on the transfer plate 298 will cause the ear 302 on that transfer plate to move to the right, and will thereby permit the pawl 180 to move its ear 190 toward the teeth on the ratchet wheel 128; but the movement of the connector 270 to the left will not have any immediate effect because the forces which the ear 304 of the pawl 310 applies to the abutment 222 of the stop 214 will resist any efforts to rotate that stop. Consequently, the initial movement of the connector 270 to the left will merely cause the right-hand end of that connector to move away from the right-hand end of the slot 218 and to move toward the left-hand end of that slot.

As the pin 300 on the transfer plate 298 moves to the right, the ear 304 on the advancing pawl 310 also will move to the right. The forces which that ear applies to the abutment 222 on the stop 214 will be great enough to cause that abutment to move with that ear; and, because that stop is mounted on the pivot 40, that stop will rotate and provide a rolling engagement rather than a sliding engagement between that ear and that abutment. Prior to the time the ear 304 on the pawl 310 moves out of the path of the teeth on the ratchet wheel 128, the ear 190 on the pawl 180 will have moved into the path of the teeth on that ratchet wheel. This means that when the transfer plate 298 moves far enough to free the ear 304 from the teeth of the ratchet wheel 128, that ratchet wheel will be able to rotate until the ear 190 on the pawl 180 halts further rotation of that ratchet wheel. However, that further rotation will only be an angular distance equal to about one-half of the width of one of the teeth on the ratchet wheel 128.

At this time, the right-hand end of the connector 270 will not have reached the left-hand end of the slot 218 in the upwardly-bent front end of the ear 216 on the stop 214. Also, the re-entrant bend 266 on the actuator 260 will still be below the level of that ear. However, as the level 246 continues to move back up to its upper position, the spring 318 will pull the pawl 310 down into engagement with the arm 303 of the transfer plate 298, and will then pull that transfer plate to the position shown by FIG. 2. Also, the re-entrant bend 266 on the actuator 260 will engage the right-hand edge of the ear 216 on the stop 214 and will force that stop to rotate back to the position shown by FIG. 2. It will be noted that the top of the re-entrant bend 266 inclines from upper right to lower left and thus can act as an inclined plane to force the stop 214 to return to the vertically-directed position shown in by FIG. 2. The overall result is that the stop 214 will have intercepted and held the pawl 310 after the ratchet wheel 128 had moved an angular distance equal to the widths of about one and one-half teeth on that ratchet wheel; and then, as the lever 246 and its actuator 260 returned to their initial positions, that ratchet wheel advanced a further angular distance equal to about one-half the width of one of the teeth on that ratchet wheel. This means that the insertion of a dime provided a total overall angular advancement of the ratchet wheel 128 equal to the width of two teeth on that ratchet wheel.

If the patron intended to insert just a dime, he will then press the button or lever at the exterior of the coin-actuated machine and thereby cause the feeling bar 169 to move upwardly and engage a further pin 155 on the credit-readout 136. Because the ratchet wheel 128 advanced an angular distance equal to the width of two teeth of that ratchet wheel, a different pin 155 will be in register with the feeling bar 169; and hence that feeling bar will be able to move further than it moved when a nickel was inserted. The movement of that feeling bar will enable the coin-actuated machine to initiate two of its cycles of operation; and, during the first of those cycles of operation, a downward force will be applied to the pin 176 on the toothed segment 170. As a result, that toothed segment will move downwardly until the arcuate projection 172 thereon engages the lower end of the slot 28 in the center wall 20 of the frame. The downward movement of the toothed segment will act through the spur gear 130 to return the ratchet wheel 128 to its initial position; and, as that ratchet wheel rotates, the lower face on the ear 190 of the pawl 180 will act as an inclined plane and will cause that ear to move out of the path of the teeth of the ratchet wheel 128.

If a quarter is inserted, that quarter will pass through the slug rejector and move into register with the quarter chute which is defined by the L-shaped bracket 74 and the plate 84. As that quarter moves downwardly into that chute, it will engage the triangular coin-receiving portion 240 of the actuator 238 and will also engage the boss 85 in that chute. That boss will force the quarter to follow the triangular coin-receiving portion 240 of the actuator 238 as that actuator moves down to the position shown in FIG. 11. As that actuator moves to that position, the lever 224 will rotate from its upper position to its lower position; and, as that lever starts moving toward its lower position, the ear 230 thereon will engage the pin 300 on the transfer plate 298 and cause that transfer plate to start rotating in the counter clockwise direction. Such rotation will cause the ear 302 on that transfer plate to engage and move the inclined face 184 on the pawl 180; and that pawl will start moving the ear 190 thereof outwardly relative to the teeth on the ratchet wheel 128. Simultaneously, that transfer plate will start moving the ear 304 on the pawl 310 inwardly of the teeth on that ratchet wheel. Shortly before the actuator 238 reaches the position shown by FIG. 11, the ear 304 on the pawl 310 will move into position between two adjacent teeth on the ratchet wheel 128 and the ear 190 on the pawl 180 will move out of the path of the teeth on that ratchet wheel. Thereupon, that ratchet wheel will be free to rotate in the counter clockwise direction in FIG. 2; and the pawl 310 will rotate with that ratchet wheel. That ratchet wheel and pawl will rotate until the notched lower end 210 of the stop 206 intercepts and holds the pin 312 on that pawl; and that ratchet wheel and pawl will have rotated an angular distance approximately equal to the widths of four and one-half teeth on that ratchet wheel. The stop 206 is rotatably mounted on the pivot 36, and the notch 210 in the lower end thereof has a rounded V-shaped configuration; and hence that stop will respond to engagement with the pin 312 on the pawl 310 to automatically center itself.

The quarter will then move downwardly past the triangular coin-receiving portion 240 and pass to the cash box; and thereupon the lever 224 will be free to start moving back up to its upper position. As that lever starts moving back up to that position, the ear 230 thereon will start to move away from the pin 300 on the transfer plate 298; and that transfer plate will then respond to the force applied by the spring 318 to start moving in the clockwise direction. As that transfer plate so moves, the ear 304 on the pawl 310 will move outwardly of the teeth on that ratchet wheel and the ear 190 on the pawl 180 will move inwardly of those teeth. Before the lever 224 reaches its upper position, the ear 190 on the pawl 180 will have moved into position between two adjacent teeth on the ratchet wheel 128 and the ear 304 on the pawl 310 will have moved out of the path of the teeth on that ratchet wheel. As the pin 312 on the pawl 310 moves to the right, in response to the clockwise movement of the transfer plate 298, that pin will apply laterally-directed forces to the stop 206; and that stop will respond to those forces to rotate in the counter clockwise direction. That rotation is important in providing a rolling engagement rather than a sliding engagement between that pawl and that stop. The overall result is that as the quarter was inserted the ratchet wheel 128 was freed for an angular advancement approximately equal to the width of four and one-half teeth of the ratchet wheel 128 and then, as the transfer plate 298 subsequently caused the ear 304 on the pawl 310 to move out of engagement with the teeth on that ratchet wheel, that ratchet wheel advanced a further angular distance equal to the width of one-half of one of the teeth on that ratchet wheel. This means that the insertion of a quarter caused the ratchet wheel 128 to move a distance equal to the width of five teeth.

If the patron intended to insert just a quarter, he would then press the lever or button at the exterior of the coin-actuated machine and thereby cause the feeling bar 169 to move upwardly until it engaged a further pin 155 on the credit-readout 136. That pin would permit that feeling bar to move up a considerable distance; and that movement would initiate a succession of five cycles of operation of that coin-actuated machine. During the first of those cycles of operation, a downward force would be applied to the pin 176 on the arcuate section 172 of the toothed segment 170; and that force would cause the ratchet wheel 128 to return to its initial position. The lower face of the ear 190 on the pawl 180 would act as an inclined plane and move that ear out of the path of the teeth on that ratchet wheel as that ratchet wheel returned to its initial position.

In the event a patron inserts several coins, each coin will cause the appropriate actuator and lever to move downwardly and will then free them for movement back up to their upper positions. The action when a nickel is inserted will be the same as that described hereinbefore, and it will effect an advancement of the ratchet wheel 128 in the counter clockwise direction an angular distance approximately equal to the width of one tooth on that ratchet wheel. The action when a dime is inserted will be the same as that described hereinbefore, and it will effect an advancement of the ratchet wheel 128 in the counter clockwise direction an angular distance approximately equal to the widths of two teeth on that ratchet wheel. The action when a quarter is inserted will be the same as that described hereinbefore, and it will effect an advancement of the ratchet wheel 128 in the counter clockwise direction an angular distance approximately equal to the width of five teeth on that ratchet wheel. While the coin-handling device of the present invention can be made to accredit patrons with the insertion of coins totalling different amounts, it has been found that a coin-handling device which can record amounts up to fifty cents is useful and satisfactory.

Some types of individuals have been known to subject coin-actuated machines to sharp blows to try to cause the coin-handling devices within those machines to establish credits without the insertion of coins or to establish larger credits than the denominations of the inserted coins would warrant. It would be undesirable to permit those types of individuals to cause the coin-handling device of the present invention to establish credits when no coins were inserted or to establish larger credits than the denominations of the inserted coins would warrant; and the lever 320 keeps that coin-handling device from establishing improper credits. Specifically, if an individual were to apply a sharp blow to the left-hand side of the coin-actuated machine containing the coin-handling device of the present invention, that blow would cause the ratchet wheel 128 to tend to move to the right, and thus away from the pawl 180, because that ratchet wheel has the center of mass thereof directly pivoted to the center wall 20. The top of the pawl 180 also would tend to move to the right, because it is directly pivoted to the center wall 20; but the bottom of that pawl, and hence the ear 190, would respond to the inertia of that pawl and tend to remain stationary. As a result, if the lever 320 were not present, the ratchet wheel 128 could shift far enough to the right to move out of engagement with the ear 190 on the pawl 180; and thereupon that ratchet wheel could rotate freely in the counter clockwise direction until the spring 192 was able to force the ear 190 on the pawl 180 back into the path of the teeth on that ratchet wheel. Any such rotation of the ratchet wheel 128 would be very undesirable; and such rotation is completely prevented by the lever 320. It will be noted that the weight 322 is disposed below the level of the pivot 60; and hence a sudden force that tended to move the center wall 20, and the pivot 60 thereon, to the right would provide a rotative couple which would tend to cause the lever 320 to rotate in the clockwise direction in FIG. 2. That tendency would cause the arm 330 on the lever 320 to apply an extra force to the pin-like projection 182 on the pawl 180 which would tend to cause the ear 190 on that pawl to move to the right with the ratchet wheel 128 and thereby remain in holding engagement with the teeth on the ratchet wheel 128; and, in practice, the lever 320 does maintain the pawl 180 in holding engagement with the teeth on the ratchet wheel 128 despite the application of sharp blows to the left-hand side of the coin-actuated machine in which the coin-handling device of the present invention is mounted.

The fact that the arm 330 is made wire-like is important in that it enables the lever 320 to provide a holding force of increased duration. Specifically, as the lever 320 responds to a sudden force to tend to rotate in the clockwise direction in FIG. 2, the arm 330 can flex and permit that lever to rotate farther than it could if that arm was rigid and unyielding. In rotating the additional distance in the clockwise direction, and in then rotating back from that additional distance, the lever 320 will remain in holding engagement with the pawl 180 for a longer period of time than it could if the arm 330 was rigid and unyielding. As a result, the arm 330 and the lever 320 make certain that the pawl 180 will be kept in holding engagement with the ratchet wheel 128 long enough to keep sharp blows of even very large magnitudes from freeing that ratchet wheel.

It will be noted that the weight 322 on the lever 320 is laterally offset from the vertical line passing through the pivot 60, and this is important in enabling the coin-handling device of the present invention to keep from establishing improper credits when sharp blows are applied to the bottom of the coin-actuated machine in which that device is mounted. If the weight 322 were to be set in vertical registry with the pivot 60, a sharp upward force applied to the center wall 20 could cause the pivot 34 to tend to move upwardly; and that tendency would coact with the inertia of the coin-operated levers 224, 246 and 272 to apply rotative couples to those levers which would tend to cause those levers to rotate in the clockwise direction in FIG. 2. That rotation could enable the ears 230, 252 and 280 on those levers to force the pin 300 on the transfer plate 298 to move to the left, and thereby move the ear 190 on the pawl 180 out of the path of the teeth on the ratchet wheel 128. Thereupon, that ratchet wheel could rotate freely in the counter clockwise direction in FIG. 2 until such time as the spring 192 was again able to force the ear 190 on the pawl 180 back into the path of the teeth of that ratchet wheel. Any such rotation of the ratchet wheel 128 would be very undesirable; and such rotation is completely prevented by the lever 320. Any upwardly-directed force that was applied to the center wall 20 and that tended to cause the levers 224, 246 and 272 to rotate in the clockwise direction in FIG. 2 would also tend to rotate the lever 320 in the clockwise direction in FIG. 2. In particular, any sudden force that tended to move the center wall 20, and the pivot 60 thereon, upawrdly would provide a rotative couple which would tend to cause the lever 320 to rotate in the clockwise direction in FIG. 2. That tendency would cause the arm 330 on the lever 320 to apply an extra force to the pin-like projection 182 on the pawl 180 which would tend to cause the ear 190 on that pawl to resist the efforts of the transfer plate 298 to shift that ear away from the teeth of the ratchet wheel 128. In practice, the lever 320 does maintain the pawl 180 in holding engagement with the teeth on the ratchet wheel 128 despite the application of sharp blows to the bottom of the coin-actuated machine in which the coin-handling device of the present iinvention is mounted. The fact that the arm 330 is made wire-like is important in that it enables the lever 320 to provide a holding force of increased duration, all as described hereinbefore. In these various ways, the weighted lover 320 protects the coin-handling device of the present invention against improper operation due to the application of blows to the left-hand side or the bottom of the coin-actuated machine in which that coin-operating device is mounted. That lever need not apply extra forces to the pawl 180 when the coin-actuated machine, in which the coin-handling device of the present invention is mounted, is struck on the top or on the right-hand side; because blows from those directions will not tend to free the ratchet wheel 128 from the ear 190 on the pawl 180. As a result, the coin-handling device provided by the present invention will not establish improper credits even if it is subjected to sharp blows from different directions.

The opening 32 formed in wall 20 of the frame of the coin-handling device will limit the extent to which the weighted lever 320 can rotate. However, that rotation will be sufficiently large to permit the ear 190 on the pawl 180 to move out of the path of the teeth on the ratchet wheel 128, whenever that ear is to so move.

The weight of a dime is quite small, even when that dime is newly minted; but when a dime becomes worn, its weight is even less. As a result, the coin-handling device provided by the present invention must be made quite sensitive or it will be unable to respond to worn dimes. To make that coin-handling device quite sensitive, the ratchet wheel 128 is made of one smooth-surfaced material while the pawls 180 and 310 are made of another smooth-surfaced material. Where the ratchet wheel 128 is made of the same material of which the pawls 180 and 310 are made, the intermolecular attraction between the abutting portions of those three elements is larger than where the ratchet wheel and those pawls are made of different materials. A particularly useful smooth-surfaced material of which the ratchet wheel 128 can be made is Nylatron G.S.—a nylon which has molybdenum disulfide incorporated within it. A particularly useful smooth-surfaced material of which the pawls 180 and 310 can be made is Delrin—a formaldehyde base thermoplastic material. Where the ratchet wheel 128 is made of the Nylatron G.S. and the pawls 180 and 310 are made from Delrin, even well worn dimes have sufficient weight to move the actuator 260 and the lever 246.

The present invention also helps well worn dimes to move the actuator 260 and the lever 246 by providing a predetermined shallow inclination on the leading faces of the teeth on the ratchet wheel 128. Specifically, the present invention forms the leading faces of the teeth on the ratchet wheel 128 so those leading faces coact with radii of that ratchet wheel to subtend angles that are between fifty-five and eighty percent of the angle of slide. The angle at which one piece of material begins to slide relative to another piece of material as those pieces are progressively tilted is the angle of slide; and the angle of slide of the materials used in the ratchet wheel 128 and the pawls 180 and 310 must be determined. Where the ratchet wheel 128 is made of Nylatron G.S. and the pawls 180 and 310 are made of Delrin, the angle of slide is between twelve and thirteen degrees. The leading faces of the teeth on the ratchet wheel 128 could not be inclined sufficiently to enable them to coact with the radii of that ratchet wheel to subend angles between twelve and thirteen degrees, because the forces applied to the ears 190 and 304 by the teeth of the ratchet wheel 128 would be able to force those ears out of the paths of those teeth. On the other hand, if the leading faces of the teeth on the ratchet wheel 128 were not to be inclined sufficiently to enable them to coact with the radii of that ratchet wheel to subtend angles greater than one-half of the angle of slide, well worn dimes could not always assure full movement of the actuator 260 and lever 246. However, by providing the leading faces of the teeth on the ratchet wheel 128 with inclinations that enable them to coact with radii of that ratchet wheel to subtend angles between fifty-five and eighty percent of the angle of slide—angles of from seven to ten degrees—the present invention avoids premature movement of the ears 190 and 304 out of the path of the teeth of the ratchet wheel 128 and yet permits a well worn dime to effect movement of those ears out of that path.

As quarters, dimes and nickels cause the triangular coin-receiving portions 240, 268 and 296 of the actuators 238, 260 and 288 to move downwardly, one or the other of the apices of those coin-receiving portions could engage an inner wall of an arcuate recess. However, the two apices of any of those coin-receiving portions can not simultaneously engage the inner walls of two arcuate recesses, because those coin-receiving portions are deliberately dimensioned so the maximum distance between the two apices of any coin-receiving portion is smaller than the distance between the inner walls of the appropriate arcuate recesses. Consequently, those triangular coin-receiving portions can not bind or stick relative to the coin chutes.

In the event a patron were to press on the lever or button at the exterior of the coin-actuated machine at the time he inserted a coin, the pressure which the feeling bar 169 might apply to the credit-readout 136 might be great enough to prevent that credit-readout from moving in response to the force applied by the spring 168. Yet, it would be very objectionable for any force which the patron could apply to the lever or button at the exterior of the coin-actuated machine to cause the coin-handling device to fail to accredit that patron with the values of the inserted coins. The present invention enables the coin-handling device to accredit each patron with the full values of the coins inserted by him, even though that patron holds the lever or button at the exterior of the coin-actuated machine. The present invention does this by using the pin 150 on the credit-readout 136 and the stops 164 and 166 on the crank 156 as a lost motion connection which will permit the crank 156 to rotate with the ratchet wheel 128 even if the credit-readout 136 is held. This means that if a quarter is inserted at a time when a patron is causing the feeling bar 169 to hold the credit-readout 136 against movement, the crank 156 will advance an angular distance corresponding to the full value of the quarter; and then, when the patron subsequently releases his pressure on the lever or button at the exterior of the coin-actuated machine, the feeling bar 169 will move downwardly and permit the spring 168 to rotate the credit-readout 136 in the clockwise direction until the pin 150 thereon engages the stop 164. At that time the patron can again apply a force to the lever or button at the exterior of the coin-actuated machine, and the feeling bar 169 will then be able to move upwardly into engagement with the appropriate pin 155 on the credit-readout 136 and thereby effect operation of the coin-actuated machine. Similarly, if a dime is inserted or if a nickel is inserted or if a combination of nickels, dimes or quarters is inserted while the patron is applying such force to the button or lever at the exterior of the coin-actuated machine that the feeling bar 169 is holding the credit-readout 136 against movement, the full values of those coins will be accredited to the patron; and then when the patron releases his pressure on that button or lever the credit-readout 136 will rotate in the clockwise direction in response to the spring 168 until the pin 150 engages the stop 164 on the crank. At that time the patron can again apply pressure to the button or lever at the exterior of the coin-actuated machine and thereby cause the feeling bar 169 to sense for the amount of credit accredited to the patron. In this way, the present invention protects the patron against loss of credits due to his premature actuation of the lever or button at the exterior of the coin-actuated machine.

To additionally make certain that the weights of well-worn dimes can fully actuate the dime-actuated lever 246, the spring 192 and the weight 322 must be made so they apply only relatively light forces to the pawl 180, and the spring 318 must be made so it applies only a relatively light force to the transfer plate 298; because the weights of those dimes must overcome those forces to move that pawl and to move that transfer plate. Yet, the spring 192 and the weight 322 must apply forces to the pawl 180 and the spring 318 must apply forces to the transfer plate 298 which are large enough to enable the ear 190 on the pawl 180 to move into the path of the teeth on the ratchet wheel 128; and those forces will cause frictional forces to develop between that ear and those teeth. Also, because the spring 178 biases the ratchet wheel 128 for rotation, the teeth of that ratchet wheel will apply further forces to the ear 190 and will apply forces to the ear 304 which will cause frictional forces to develop between those ears and those teeth. All of this means that the ears 190 and 304 must move relative to the teeth of the ratchet wheel 128 despite finite frictional forces between those teeth and those ears. To enable those ears to so move, the pivot 34 for the pawl 180 is mounted on a line which is at right angles to the leading face of a tooth, on the ratchet wheel 128, that is held by the ear 190 and which is spaced two-thirds of the way in from the tip of that tooth; and the pivot 40 for the stop 214 is mounted on a line which is at right angles to the leading face of a tooth, on the ratchet wheel 128, that is held by the ear 304 when that ear is held by the stop 214 and which is spaced two-thirds of the way in from the tip of the tooth. Also, the pivot 36 for the stop 206 is mounted on a line which is at right angles to the leading face of a tooth, on the ratchet wheel 128, that is held by the ear 306 when that ear is held by the stop 206 and which is spaced two-thirds of the way in from the tip of that tooth. Further, the points of engagement between the pin 300 on the transfer plate 298 and the ears 230, 252 and 280 of the coin-actuated levers 224, 246 and 272 are disposed adjacent a line that extends between the pivots 34 and 62, respectively, for those coin-actuated levers and for that transfer plate. In fact, those points of engagement are at the right-hand side of that line whenever the components of the coin-handling device are in their normal positions and are at the left-hand side of that line whenever the coin-actuated levers are in their fully-rotated positions. This is important in enabling the arc of rotation of the pin 300 and the arcs of rotation of the ears 230, 252 and 280 to be substantially the same, and also in essentially providing rolling engagement rather than sliding engagement between said ears and said pin. Similarly, the point of engagement between the ear 302 on the transfer plate 298 and the inclined surface 184 on the pawl 180 are disposed adjacent the line that extends between the pivots 34 and 62, respectively, for the pawl 180 and for that transfer plate. In fact that point of engagement is at the right-hand side of that line whenever the components of the coin-handling device are in their normal positions and is at the left-hand side of that line when the pawl 180 is in its counter clockwisemost position. This is important in enabling the arc of rotation of the ear 302 and the arc of rotation of the inclined surface 184 to be substantially the same, and also in essentially providing rolling engagement rather than sliding engagement between said ear and said inclined surface. The combined result is that even well-worn dimes can fully actuate the coin-handling device of the present invention.

The stop 194 moves as a result of movement of the nickel-actuated lever 272, the stop 214 moves as a result of the movement of the dime-actuated lever 246, and the stop 206 moves as a result of the movement of the quarter-actuated lever 224; but those stops are separate from and independent of those levers. This is desirable because it frees those levers from the impacts and stresses which the ratchet wheel 128 applies to those stops.

The coin-receiving portions 240, 268 and 296 of the actuators 238, 260 and 288 extend far enough into the arcuate recesses 112 and 114, 116 and 118, and 120 and 122 to positively keep quarters, dimes and nickels from slipping past those coin-receiving portions without forcing those actuators to move downwardly. Also, because those coin-receiving portions are bent upwardly at angles to the adjacent portions of those actuators, those coin-receiving portions keep quarters, dimes and nickels from slipping down into the spaces between those adjacent portions and the inner walls of the quarter, dime and nickel chutes. Further, the slots 106, 108 and 110 are narrower, respectively, than quarters, dimes and nickels. As a result, coins introduced into the coin chutes will be forced to stay in those coin chutes until they move the actuators 238, 260 and 288 down to the positions shown by FIGS. 11, 10 and 9.

Whereas the drawing and accompanying description have shown and described a preferred embodiment of the present invention it should be apparent to those skilled in the art that various changes may be made in the form of the invention without affecting the scope thereof.

What we claim is:

1. A coin-handling device that can respond to the insertion of coins to establish credits and that comprises:
(a) a pivot,
(b) a ratchet wheel rotatably mounted on said pivot,
(c) said ratchet wheel being biased for rotation in one direction but being rotatable in the opposite direction,
(d) a pawl that normally engages said ratchet wheel to prevent rotation of said ratchet wheel in said one direction but that can move out of engagement with said ratchet wheel to permit said ratchet wheel to rotate in said one direction,
(e) a second pivot,
(f) a coin-operated lever that has an actuator with a coin-receiving portion which is adapted to receive coins of a pre-determined denomination,
(g) a second coin-operated lever that has an actuator with a coin-receiving portion which is adapted to receive coins of a second predetermined denomination,
(h) a third coin-operated lever that has an actuator with a coin-receiving portion which is adapted to receive coins of a third predetermined denomination,
(i) said levers being rotatably mounted on said second pivot and being rotatable relative to the first said pivot and relative to said ratchet wheel,
(j) a third pivot,
(k) a transfer plate that is rotatably mounted on said third pivot and that is selectively engagable by each of said levers,
(l) said transfer plate normally permitting said pawl to remain in position to hold said ratchet wheel against rotation in said one direction but being movable by any one of said levers to move said pawl to a position where it frees said ratchet wheel,
(m) a fourth pivot that is carried by said transfer plate,
(n) a second pawl that is rotatably mounted on said fourth pivot and that is movable with said transfer plate,
(o) said second pawl normally being spaced from said ratchet wheel to permit rotation of said ratchet wheel relative to said second pawl but responding to movement of said transfer plate to move into engagement with said ratchet wheel,
(p) said second pawl having the center of rotation thereof adjacent the first said pivot whereby said second pawl can rotate with said ratchet wheel,
(q) a stop that normally is in the path of said second pawl and that can intercept said second pawl and hold said second pawl and said ratchet wheel after said second pawl and said ratchet wheel have moved a predetermined distance,
(r) a second stop that is normally spaced from the path of said second pawl but that can be moved into the path of said second pawl,
(s) a connector which extends between said second stop and said second lever,
(t) a slot in said second stop that coacts with said connector to provide a lost-motion connection between said second lever and said second stop,
(u) said second stop responding to coin-induced movement of said second lever to move into position in the path of said second pawl and thereby intercept said second pawl and said ratchet wheel after said second pawl and said ratchet wheel have moved a second predetermined distance,
(v) a third stop that normally is out of the path of the teeth on said ratchet wheel but that can move into the path of said teeth on said ratchet wheel to intercept said ratchet wheel after said ratchet wheel has moved a third predetermined distance, (w) said second pawl being movable radially outwardly of said ratchet wheel to free said ratchet wheel after said second pawl and said ratchet wheel have been intercepted by the first said and said second stops, (x) the first said stop being rotatable whereby the portion of the first said stop which receives and holds said second pawl can move with said second pawl as said second pawl is moved radially outwardly of said ratchet wheel, (y) said lost-motion connection permitting said second stop to move with said second pawl as said second pawl is moved radially outwardly of said ratchet wheel, (z) a mechanism that can selectively restore said ratchet wheel to its initial position, (aa) a credit-readout that is movable to permit initiation of a cycle of operation of a controlled device which said coin-handling device is used, (ab) a member that rotates with said ratchet wheel, (ac) said credit-readout normally rotating with said member but permitting said member to rotate if it is held, (ad) a fifth pivot, (ae) an inertial element that is mounted on said fifth pivot and that has an arm thereof disposed adjacent the first said pawl, (af) said arm of said inertial element being yieldable, (ag) said inertial element holding the first said pawl in engagement with the teeth of said ratchet wheel despite the application of sharp blows to said coin-handling device, (ah) coin chutes that accommodate said coin-receiving portions of said actuators, (ai) said coin chutes having recesses in the inner surfaces thereof to accommodate said coin-receiving portions of said actuators, whereby said coin-receiving portions can be wider than the widths of said coin chutes and thereby keep coins from passing downwardly through said coin chutes without moving said actuators, (aj) said coin-receiving portions of said actuators being triangular but having rounded apices, (ak) said actuators being pivoted to said coin-operated levers to permit free movement of said actuators relative to said coin chutes despite mis-alinement of said coin-operated levers and said coin chutes, (al) said coin chutes having narrow surfaces that can receive and guide said actuators.

2. A coin-handling device than can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said rachet wheel to rotate in said one direction, (e) a second pivot, (f) a coin-operated lever that has an actuator with a coin-receiving portion which is adapted to receive coins of a predetermined denomination, (g) a second coin-operated lever that has an actuator with a coin-receiving portion which is adapted to receive coins of a second predetermined denomination, (h) a third coin-operated lever that has an actuator with a coin-receiving portion which is adapted to receive coins of a third predetermined denomination, (i) said levers being rotatably mounted on said second pivot and being rotatable relative to the first said pivot and relative to said ratchet wheel, (j) a third pivot, (k) a transfer plate that is rotatably mounted on said third pivot and that is selectively engageable by each of said levers, (l) said transfer plate normally permitting said pawl to remain in position to hold said ratchet wheel against rotation in said one direction but being movable by any one of said levers to move said pawl to a position where it frees said ratchet wheel, (m) a stop that can permit said ratchet wheel to rotate a predetermined angular distance and then halt further rotation of said ratchet wheel, (n) a second stop that can permit said ratchet wheel to rotate a second predetermined angular distance and then halt further rotation of said ratchet wheel, (o) a third stop that can permit said ratchet wheel to rotate a third predetermined angular distance and then halt further rotation of said ratchet wheel, (p) the first said stop halting rotation of said ratchet wheel whenever said ratchet wheel was released for movement by the first said coin-operated lever, (q) said second stop halting operation of said ratchet wheel whenever said ratchet wheel was released for movement by said second coin-operated lever, (r) said third stop halting rotation of said ratchet wheel whenever said ratchet wheel was released for movement by said third coin-operated lever, (s) said stops being separate from said coin-operated levers so said coin-operated levers are free of the stresses imparted to said stops by said ratchet wheel a said stops halt rotation of said ratchet wheel.

3. A coin-handling device than can respond to the insertion of coins to establish credits and that comprises:

(a) pivot, (b) a ratchet wheel rotatably mounted on said pivot, (c) said ratchet wheel being biased for rotation in one direction but being rotatable in the opposite direction, (d) a coin-operated lever that has an actuator with a coin-receiving portion which is adapted to receive coins of a predetermined denomination, (e) a second coin-operated lever that has an actuator with a coin-receiving portion which is adapted to receive coins of a second predetermined denomination, (f) a third coin-operated lever that has an actuator with a coin-receiving portion which is adapted to receive coins of a third predetermined denomination, (g) a stop that can permit said ratchet wheel to rotate a predetermined angular distance and then halt further rotation of said ratchet wheel, (h) a second stop that can permit said ratchet wheel to rotate a second predetermined angular distance and then halt further rotation of said ratchet wheel, (i) a third stop that can permit said ratchet wheel to rotate a third predetermined angular distance and then halt further rotation of said ratchet wheel, (j) the first said stop halting rotation of said ratchet wheel whenever said ratchet wheel was released for movement by the first said coin-operated lever, (k) said second stop halting rotation of said ratchet wheel whenever said ratchet wheel was released for movement by said second coin-operated lever, (l) said third stop halting rotation of said ratchet wheel whenever said ratchet wheel was released for movement by said third coin-operated lever, (m) said stops being rotatable and being rotatable independently of each other.

4. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction,
(d) a pawl that normally engages said ratchet wheel to prevent rotation of said ratchet wheel in said one direction but that can move out of engagement with said ratchet wheel to permit said ratchet wheel to rotate in said one direction,
(e) a second pivot,
(f) a coin-operated lever that has an actuator with a coin-receiving portion which is adapted to receive coins of a predetermined denomination,
(g) a second coin-operated lever that has an actuator with a coin-receiving portion which is adapted to receive coins of a second predetermined denomination,
(h) said levers being rotatably mounted on said second pivot and being rotatable relative to the first said pivot and relative to said ratchet wheel,
(i) a third pivot,
(j) a transfer plate that is rotatably mounted on said third pivot and that is selectively engageable by each of said levers,
(k) said transfer plate normally permitting said pawl to remain in position to hold said ratchet wheel against rotation in said one direction but being movable by any one of said levers to move said pawl to a position where it frees said ratchet wheel,
(l) a fourth pivot that is carried by said transfer plate,
(m) a second pawl that is rotatably mounted on said fourth pivot and that is movable with said transfer plate,
(n) said second pawl normally being spaced from said ratchet wheel to permit rotation of said ratchet wheel relative to said second pawl but responding to movement of said transfer plate to move into engagement with said ratchet wheel,
(o) said second pawl having the center of rotation thereof adjacent the first said pivot whereby said second pawl can rotate with said ratchet wheel,
(p) a stop that normally is in the path of said second pawl and that can intercept said second pawl and hold said second pawl and said ratchet wheel after said second pawl and said ratchet wheel have moved a predetermined distance,
(q) a second stop that is normally spaced from the path of said second pawl but that can be moved into the path of said second pawl,
(r) a connector which extends between said second stop and said second lever,
(s) a slot in said second stop that coacts with said connector to provide a lost-motion connection between said second lever and said second stop,
(t) said second stop responding to coin-induced movement of said second lever to move into position in the path of said second pawl and thereby intercept said second pawl and said ratchet wheel after said second pawl and said ratchet wheel have moved a second predetermined distance,
(u) said second pawl being movable radially outwardly of said ratchet wheel to free said ratchet wheel after said second pawl and said ratchet wheel have been intercepted by the first said and said second stops,
(v) the first said stop being rotatable whereby the portion of the first said stop which receives and holds said second pawl can move with said second pawl as said second pawl is moved radially outwardly of said ratchel wheel,
(w) said lost-motion connection permitting said second stop to move with said second pawl as said second pawl is moved radially outwardly of said ratchet wheel.

5. A coin-handling device that can respond to the insertion of coins to establish credits and that comprises:
(a) a pivot,
(b) a ratchet wheel rotatably mounted on said pivot,
(c) said ratchet wheel being biased for rotation in one direction but being rotatable in the opposite direction,
(d) a pawl that normally engages said ratchet wheel to prevent rotation of said ratchet wheel in said one direction but that can move out of engagement with said ratchet wheel to permit said ratchet wheel to rotate in said one direction,
(e) a coin-operated lever that has an actuator with a coin-receiving portion which is adapted to receive coins of a predetermined denomination,
(f) a second coin-operated lever that has an actuator with a coin-receiving portion which is adapted to receive coins of a second predetermined denomination,
(g) a third pivot,
(h) a transfer plate that is rotatably mounted on said third pivot and that is selectively engageable by each of said levers,
(i) said transfer plate normally permitting said pawl to remain in position to hold said ratchet wheel against rotation in said one direction but being movable by any one of said levers to move said pawl to a position where it frees said ratchet wheel,
(j) a fourth pivot that is carried by said transfer plate,
(k) a second pawl that is rotatably mounted on said fourth pivot and that is movable with said transfer plate,
(l) said second pawl normally being spaced from said ratchet wheel to permit rotation of said ratchet wheel relative to said second pawl but responding to movement of said transfer plate to move into engagement with said ratchet wheel,
(m) said second pawl having the center of rotation thereof adjacent the first said pivot whereby said second pawl can rotate with said ratchet wheel,
(n) a stop that normally is in the path of said second pawl and that can intercept said second pawl and hold said second pawl and said ratchet wheel after said second pawl and said ratchet wheel have moved a predetermined distance,
(o) a second stop that is normally spaced from the path of said second pawl but that can be moved into the path of said second pawl,
(p) said second stop responding to coin-induced movement of said second lever to move into position in the path of said second pawl and thereby intercept said second pawl and said ratchet wheel after said second pawl and said ratchet wheel have moved a second predetermined distance,
(q) said second pawl being movable radially outwardly of said ratchet wheel to free said ratchet after said second pawl and said ratchet wheel have been intercepted by the first said and said second stops,
(r) the first said stop being rotatable whereby the portion of the first said stop which receives and holds said second pawl can move with said second pawl as said second pawl is moved radially outwardly of said ratchet wheel,
(s) said second stop moving with said second pawl as said second pawl is moved radially outwardly of said ratchet wheel.

6. A coin-handling device that can respond to the insertion of coins to establish credits and that comprises:
(a) a pivot,
(b) a ratchet wheel rotatably mounted on said pivot,
(c) said ratchet wheel being biased for rotation in one direction but being rotatable in the opposite direction,
(d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a second coin-operated lever that has an actuator with a coin-receiving portion which is adapted to receive coins of a second predetermined denomination, (g) a second pawl that can move with and relative to said ratchet wheel, (h) a stop that normally is in the path of said second pawl and that can intercept said second pawl and hold said second pawl and said ratchet wheel after said second pawl and said ratchet wheel have moved a predetermined distance, (i) a second stop that is normally spaced from the path of said second pawl but that can be moved into the path of said second pawl, (j) said second stop responding to coin-induced movement of said second lever to move into position in the path of said second pawl and thereby intercept said second pawl and said ratchet wheel after said second pawl and said ratchet wheel have moved a second predetermined distance, (k) said second pawl being movable radially outwardly of said ratchet wheel to free said ratchet wheel after said second pawl and said ratchet wheel have been intercepted by the first said and said second stops, (l) the first said stop being rotatable whereby the portion of the first said stop which receives and holds said second pawl can move with said second pawl as said second pawl is moved radially outwardly of said ratchet wheel, (m) said second stop moving with said second pawl as said second pawl is moved radially outwardly of said ratchet wheel, (n) whereby a rolling engagement rather than a sliding engagement is provided between said second pawl and the first said and said second stops.

7. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a second coin-operated lever that has an actuator with a coin-receiving portion which is adapted to receive coins of a second predetermined denomination, (g) a second pawl that can move with and relative to said ratchet wheel, (h) a stop that normally is in the path of said second pawl and that can intercept said second pawl and hold said second pawl and said ratchet wheel after said second pawl and said ratchet wheel have moved a predetermined distance, (i) a second stop that is normally spaced from the path of said second pawl but that can be moved into the path of said second pawl, (j) a connector which extends between said second stop and said second lever, (k) a slot in said second stop that coacts with said connector to provide a lost-motion connection between said second lever and said second stop, (l) said second stop responding to coin-induced movement of said second lever to move into position in the path of said second pawl and thereby intercept said second pawl and said ratchet wheel after said second pawl and said ratchet wheel have moved a second predetermined distance, (m) said second pawl being movable radially outwardly of said ratchet wheel to free said ratchet wheel after said second pawl and said ratchet wheel have been intercepted by the first said and said second stops, (n) the first said stop being rotatable whereby the portion of the first said stop which receives and holds said second pawl can move with said second pawl as said second pawl is moved radially outwardly of said ratchet wheel, (o) said lost-motion connection permitting said second stop to move with said second pawl as said second pawl is moved radially outwardly of said ratchet wheel.

8. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a stop that is normally out of position to block rotation of said ratchet wheel but is movable into position to block rotation of said ratchet wheel, (g) an abutment on said coin-operated lever that normally engages said stop and holds said stop out of position to block rotation of said ratchet wheel, and (h) a connector that extends between said coin-operated lever and said stop, (i) said abutment on said actuator responding to movement of said actuator and said coin-operated lever to free said stop for movement into position to block rotation of said ratchet wheel, (j) said connector responding to movement of said coin-operated lever to move said stop into position to block rotation of said ratchet wheel.

9. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a second pawl that can move with and relative to said ratchet wheel, (g) a stop that is movable into the path of said second pawl and that can intercept said second pawl and hold said second pawl and said ratchet wheel after said second pawl and said ratchet wheel have moved a predetermined distance, (h) said stop normally being out of position to block rotation of said ratchet wheel and said second pawl but being movable into position to block rotation of said ratchet wheel and said second pawl, (i) an abutment on said coin-operated lever that normally engages said stop and holds said stop out of position to block rotation of said ratchet wheel, and (j) a connector that extends between said coin-operated lever and said stop, (k) a slot in said stop that coacts with said connector to provide a lost-motion connection between said lever and said stop, (l) said abutment on said actuator responding to movement of said actuator and said coin-operated lever to free said stop for movement into position to block rotation of said ratchet wheel and said second pawl, (m) said connector responding to movement of said coin-operated lever to move said stop into position to block rotation of said ratchet wheel and said second pawl, (n) said second pawl being movable radially outwardly of said ratchet wheel to free said ratchet wheel after said second pawl and said ratchet wheel have been intercepted by said stop, (o) said lost-motion connection permitting said stop to move with said second pawl as said second pawl is moved radially outwardly of said ratchet wheel.

10. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a stop that is normally out of position to block rotation of said ratchet wheel but is movable into position to block rotation of said ratchet wheel, (g) an abutment on said actuator for said coin-operated lever that normally engages said stop and holds said stop out of position to block rotation of said ratchet wheel, and (h) a connector that extends between said coin-operated lever and said stop, (i) said abutment on said actuator responding to movement of said actuator and said coin-operated lever to free said stop for movement into position to block rotation of said ratchet wheel, (j) said connector responding to movement of said coin-operated lever to move said stop into position to block rotation of said ratchet wheel, (k) said abutment having a wedge-shaped surface thereon to enable said abutment to engage said stop and move said stop back to its normal position.

11. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a stop that is normally out of position to block rotation of said ratchet wheel but is movable into position to block rotation of said ratchet wheel, (g) an abutment on said coin-operated lever that normally engages said stop and holds said stop out of position to block rotation of said ratchet wheel, and (h) said abutment on said actuator responding to movement of said actuator and said coin-operated lever to free said stop for movement into position to block rotation of said ratchet wheel.

12. A coin-handling device that can respond to the insertion of coins to establish credits and that comprises:

(a) a pivot, (b) a ratchet wheel rotatably mounted on said pivot, (c) said ratchet wheel being biased for rotation in one direction but being rotatable in the opposite direction, (d) a pawl that normally engages said ratchet wheel to prevent rotation of said ratchet wheel in said one direction but that can move out of engagement with said ratchet wheel to permit said ratchet wheel to rotate in said one direction, (e) a coin-operated lever that has an actuator with a coin-receiving portion which is adapted to receive coins of a predetermined denomination, (f) a second pawl that can move with and relative to said ratchet wheel, (g) a stop that normally is in the path of said second pawl and that can intercept said second pawl and hold said second pawl and said ratchet wheel after said second pawl and said ratchet wheel have moved a predetermined distance, (h) said second pawl being movable radially outwardly of said ratchet wheel to free said ratchet wheel after said stop has intercepted said ratchet wheel and said second pawl, (i) said stop being rotatable whereby the portion of said stop which receives said second pawl can move with said second pawl as said second pawl moves outwardly of said ratchet wheel, (j) said rotation of said stop being limited so said stop will always be in register with said second pawl.

13. In a coin-handling device:

(a) a pivot, (b) a lever that is rotatably mounted on said pivot, (c) a pair of ears on said lever that have openings therein, (d) said openings in said ears being alined and defining a line which is transversely directed of said pivot, (e) said lever having a further ear that is disposed above the level of the uppermost of said pair of ears and that is laterally displaced from said uppermost ear of said pair of ears, (f) an actuator for said lever that has a portion thereof which can extend into, and which can rotate relative to, said openings in said pair of ears and which can be held against downward movement and against lateral displacement by said ears, (g) said actuator underlying said further ear on said lever and being held by said further ear against movement upwardly and out of engagement with said pair of ears, (h) the free end of said actuator extending into a coin chute and thereby being held in position under said further ear, whereby said pair of ears and said further ear and said coin chute can normally maintain said actuator in assembled relation with said lever, (i) said further ear permitting limited rotative movement of said actuator relative to said pair of ears while said actuator is overlain by said further ear, thereby permitting free movement of said actuator relative to said coin chute and preventing binding and sticking of that actuator relative to said coin chute while said actuator is held in assembled relation with said lever, (j) said portion of said actuator being bent at right angles to an adjacent portion of said actuator, (k) said coin chute having portions with small surface areas to guide said free end of said actuator, thereby minimizing the frictional areas between said coin chute and said actuator, (l) said adjacent portion of said actuator being bendable to move it out of register with said further ear, thereby facilitating assembly and dis-assembly of the first said portion of said actuator with said pair of ears, (m) said adjacent portion being adapted, when the bending forces are removed, to move into position beneath said further ear.

14. In a coin-handling device:

(a) a movable lever, (b) a pair of ears on said lever that have openings therein, (c) said openings being alined, (d) an actuator for said lever that has a portion thereof which extends into, and which can rotate relative to, said openings in said pair of ears, (e) said actuator underlying a further ear on said lever and being held by said further ear against movement upwardly and out of engagement with said pair of ears, (f) the free end of said actuator extending into and being held within a coin chute and thereby being held in position under said further ear, whereby said pair of ears and said further ear and said coin chute can normally maintain said actuator in assembled relation with said lever, (g) said further ear permitting limited rotative movement of said actuator relative to said pair of ears while said actuator is overlain by said further ear and while said free end of said actuator is held within said coin chute, thereby permitting free coin-induced movement of said actuator relative to said coin chute and preventing binding and sticking of that actuator relative to said coin chute while said actuator is held in assembled relation with said lever, (h) a portion of said actuator which is adjacent to the first said portion of said actuator being bendable to move it out of register with said further ear, thereby facilitating assembly and dis-assembly of the first said portion of said actuator with said pair of ears, (i) said adjacent portion being adapted, when the bending forces are removed, to move into position beneath said further ear.

15. In a coin-handling device:

(a) a movable lever, (b) a pair of ears on said lever that have openings therein, (c) said openings being alined, (d) an actuator for said lever that has a portion thereof which can extend into, and which can rotate relative to, said openings in said pair of ears and which can be held against downward movement and against lateral displacement by said ears, (e) the free end of said actuator extending into and being held within a coin chute, and (f) means to hold said portion of said actuator within said openings in said pair of ears and to hold said free end of said actuator within said coin chute while permitting said actuator to rotate limited distances relative to said lever, (g) whereby said actuator can move freely in response to a coin without binding or sticking against said coin chute despite mis-alinement of said lever and said coin chute.

16. In a coin-handling device:

(a) a movable lever, (b) a pair of ears on said lever that have openings therein, (c) said openings being alined, (d) an actuator for said lever that has a portion thereof which can extend into, and which can rotate relative to, said openings in said pair of ears, (e) said ears holding said portion of said actuator against movement downwardly, and against displacement laterally, of said actuator, (f) a coin chute, (g) said actuator having the free end thereof extending into said coin chute, and (h) surfaces on said coin chute and on said actuator that coact to permit limited rotation of said actuator relative to said ears but that coact to hold said free end of said actuator within said coin chute throughout each cycle of operation of said coin-handling device, (i) the said limited rotation of said actuator relative to said lever enabling said free end of said actuator to move freely in said coin chute in response to a coin in said coin chute without binding or sticking against said coin chute despite mis-alinement of said lever and said coin chute.

17. In a coin-handling device:

(a) a movable lever, (b) pivots on said lever that are alined, (c) an actuator for said lever that has a portion which can be held by said pivots for rotation relative to said lever, (d) a coin chute, (e) said actuator having the free end thereof extending into said coin chute, and (f) surfaces on said coin chute and on said actuator that coact to permit limited rotation of said actuator relative to said lever but that coact to hold said free end of said actuator within said coin chute throughout each cycle of operation of said coin-handling device, (g) the said limited rotation of said actuator relative to said lever enabling said free end of said actuator to move freely in said coin chute in response to a coin in said coin chute without binding or sticking against said coin chute despite mis-alinement of said lever and said coin chute.

18. In a coin-handling device:

(a) a movable lever, (b) an actuator that is mounted on said movable lever for sideways rotation relative to said lever, and (c) a coin chute, (d) said actuator having the free end thereof extending into said coin chute, and (e) surfaces on said coin chute and on said actuator that coact to permit limited rotation of said actuator relative to said lever but that coact to hold said free end of said actuator within said coin chute throughout each cycle of operation of said coin-handling device, (f) the said limited rotation of said actuator relative to said lever enabling said free end of said actuator to move freely in said coin chute in response to a coin in said coin chute without binding or sticking against said coin chute despite mis-alinement of said lever and said coin chute.

19. In a coin-handling device:

(a) a pivot, (b) a lever that is rotatably mounted on said pivot, (c) an actuator for said lever, (d) a coin chute which has wide walls that are generally parallel to said actuator, (e) said actuator having the free end thereof extending into said coin chute, and (f) said wide walls of said coin chute having portions which extend toward each other and which have small surface areas to guide said free end of said actuator, thereby minimizing the frictional areas between said coin chute and said actuator, (g) said coin chute defining a path for coins moving relative to said actuator, (h) said portions with said small surface areas being displaced from said path for coins and being spaced apart a distance less than the thickness of a coin, whereby a coin can not pass between said portions with said small surface areas.

20. In a coin-handling device:
(a) a movable lever,
(b) an actuator that is readily assembled with and disassembled from said lever,
(c) a coin chute that has a narrow slot therein, and
(d) said actuator normally having the free end thereof extending through said slot and being confined and held within said coin chute,
(e) the actuator having a portion adjacent the free end that is formed in a shape having a dimension that is wider than the width of said slot but being adapted, when said actuator is freed from said lever and is rotated, to pass through said slot.

21. In a coin-handling device:
(a) a credit-establishing member that is movable in response to the insertion of coins,
(b) a coin-responsive element and a holding element that respond to the insertion of coins to move said credit-establishing member in step-by-step fashion,
(c) a driving member that is movable in said step-by-step fashion with said credit-establishing member,
(d) a driven member that can be driven to reflect credits established by said credit-establishing member,
(e) a sensing member that can coact with said driven member to sense the credits established by said credit-establishing member,
(f) means biasing said driven member for movement in step-by-step fashion with said driving member, and hence with said credit-establishing member, and
(g) a lost-motion connection between said driving and driven members that enables said coin-responsive element and said holding element to move said credit-establishing member and said driving member in said step-by-step fashion in response to the insertion of coins even though said driven member is held stationary by said sensing member,
(h) said biasing means subsequently moving said driven member into engagement with said driving member when the force on said sensing member is removed, whereby a holding force applied to said driven member by said sensing member will not prevent proper advancement of the credit-establishing member when coins are inserted into said coin-handling device.

22. In a coin-handling device:
(a) a credit-establishing member that is movable in response to the insertion of coins,
(b) a coin-responsive element and a holding element that respond to the insertion of coins to move said credit-establishing member in step-by-step fashion,
(c) a driving member that is movable in said step-by-step fashion with said credit-establishing member,
(d) a driven member that can be driven to reflect credits established by said credit-establishing member,
(e) a sensing member that can coact with said driven member to sense the credits established by said credit-establishing member,
(f) means biasing said driven member for movement in step-by-step fashion with said driving member, and hence with said credit-establishing member, and
(g) a lost-motion connection between said driving and driven members that enables said coin-responsive element and said holding element to move said credit-establishing member and said driving member in said step-by-step fashion in response to the insertion of coins even though said driven member is held stationary by said sensing member,
(h) said biasing means subsequently moving said driven member into engagement with said driving member when the force on said sensing member is removed, whereby a holding force applied to said driven member by said sensing member will not prevent proper advancement of the credit-establishing member when coins are inserted into said coin-handling device,
(i) said credit-establishing member being a ratchet wheel,
(j) said driving member being a crank,
(k) said driven member being a credit-readout.

23. In a coin-handling device:
(a) a credit-establishing element that is movable in response to the insertion of coins,
(b) a driving member that is movable with said credit-establishing element,
(c) a driven member that can be driven to reflect credits established by said credit-establishing element,
(d) a sensing element that can coact with said driven member to sense the credits established by said credit-establishing element,
(e) said driven member being biased for movement with said driving member, and hence with said credit-establishing element,
(f) a lost-motion connection between said driving and driven members that enables said credit-establishing element and said driving member to move in response to the insertion of coins even though said driven member is held stationary by said sensing element,
(g) said driven member subsequently moving into engagement with said driving member when the force on said sensing element is removed, whereby a holding force applied to said driven member by said sensing element will not prevent proper advancement of the credit-establishing element when coins are inserted into said coin-handling device,
(h) said lost-motion connection including a pin and a stop,
(i) said pin being on one of said members and said stop being on the other of said members, and
(j) a spring that normally holds said driven member for conjoint movement with said driving member.

24. In a coin-handling device:
(a) a coin chute which has wide walls and narrow walls,
(b) an elongated recess in one of said wide walls of said coin chute,
(c) an elongated slot in one of said narrow walls of said coin chute, and
(d) an actuator that extends through said slot and has a coin-receiving portion disposed and held within said coin chute in register with said elongated recess,
(e) said coin-receiving portion being wider than the width of said coin chute and being closely adjacent both of the wide walls of said coin chute but extending into said elongated recess so it can not simultaneously engage said elongated recess and the opposite wall of said coin chute.

25. In a coin-handling device:
(a) a coin which has wide walls and narrow walls,
(b) an elongated recess in one of said wide walls of said coin chute,
(c) an elongated slot in one of said narrow walls of said coin chute,
(d) a second elongated recess in another of said wide walls of said coin chute,
(e) the first said and third walls being in confronting relation,
(f) the first said and said second elongated recesses being in register with each other,
(g) a stiff actuator that has a narrow portion which extends through said slot and has a coin-receiving portion disposed within said coin chute in register with said elongated recesses,
(h) said coin-receiving portion being wider than said narrow portion of said actuator and also being wider than the width of said coin chute but extending into said elongated recesses so it can not simultaneously engage the first said and said third walls.

26. In a coin-handling device:
(a) a coin chute which has wide walls and narrow walls,
(b) an elongated recess in one of said wide walls of said coin chute,
(c) an elongated slot in one of said narrow walls of said coin chute,
(d) a second elongated recess in another of said wide walls of said coin chute,
(e) the first said and said third walls being in confronting relation,
(f) the first said and said second elongated recesses being in register with each other,
(g) a stiff actuator that has a narrow portion which extends through said slot and has a coin-receiving portion disposed within said coin chute in register with said elongated recesses,
(h) said coin-receiving portion being wider than said narrow portion of said actuator and also being wider than the width of said coin chute but extending into said elongated recesses so it can not simultaneously engage the first said and said third walls,
(i) the extending of said coin-receiving portion into both of said elongated recesses making certain that a coin can not slip down between the first said and said third walls of said coin chute and said coin-receiving portion.

27. In a coin-handling device:
(a) a coin chute which has wide walls and narrow walls,
(b) an elongated recess in one of said wide walls of said coin chute,
(c) an elongated slot in one of said narrow walls of said coin chute, and
(d) a stiff actuator that has a narrow portion which extends through said slot and has a coin-receiving portion disposed within said coin chute in register with said elongated recess,
(e) said coin-receiving portion being wider than said narrow portion of said actuator and also being wider than the width of said coin chute but extending into said elongated recess so it can not simultaneously engage said elongated recess and the opposite wall of said coin chute,
(f) said coin-receiving portion being rounded to present a rounded face to said elongated recess so said coin-receiving portion can not bind or stick against said coin chute.

28. In a coin-handling device:
(a) a pivot,
(b) a ratchet wheel that is rotatably mounted on said pivot,
(c) a pawl that normally engages said ratchet wheel to prevent rotation of said ratchet wheel, and
(d) a lever that is rotatably mounted adjacent said pawl and that has a weight secured thereto and that can urge said pawl into holding engagement with said ratchet wheel,
(e) said pawl responding to blows that are applied to said coin-handling device in a predetermined direction to tend to move away from said ratchet wheel,
(f) said weight being angularly displaced from said predetermined direction so said lever will respond to said blows applied to said coin-handling device in said predetermined direction to apply a force to said pawl to urge said pawl into holding engagement with said ratchet wheel.

29. In a coin-handling device:
(a) a pivot,
(b) a ratchet wheel that is rotatably mounted on said pivot,
(c) a pawl that normally engages said ratchet wheel to prevent rotation of said ratchet wheel, and
(d) a lever that is rotatably mounted adjacent said pawl and that has a weight secured thereto and that can urge said pawl into holding engagement with said ratchet wheel.
(e) said pawl responding to blows that are applied to said coin-handling device in a predetermined direction to tend to move away from said ratchet wheel,
(f) said weight being angularly displaced from said predetermined direction so said lever will respond to said blows applied to said coin-handling device in said predetermined direction to apply a force to said pawl to urge said pawl into holding engagement with said ratchet wheel,
(g) said lever having a yieldable arm that engages said pawl and that increases the duration of the period during which said lever applies forces to said pawl.

30. In a coin-handling device:
(a) a pivot,
(b) a ratchet wheel that is rotatably mounted on said pivot,
(c) a pawl that normally engages said ratchet wheel to prevent rotation of said ratchet wheel, and
(d) a lever that is rotatably mounted adjacent said pawl and that has a weight secured thereto,
(e) said pawl responding to blows that are applied to said coin-handling device in a predetermined direction to tend to move away from said ratchet wheel,
(f) said weight being angularly displaced from said predetermined direction so said lever will respond to said blows applied to said coin-handling device in said predetermined direction to apply a force to said pawl to urge said pawl into holding engagement with said ratchet wheel,
(g) said lever normally applying a force to said pawl to urge said pawl into holding engagement with said ratchet wheel and responding to said blows to apply a larger force to said pawl.

31. In a coin-handling device:
(a) a pivot,
(b) a ratchet wheel that is rotatably mounted on said pivot,
(c) a pawl that normally engages said ratchet wheel to prevent rotation of said ratchet wheel,
(d) a second pivot,
(e) a lever that is rotatably mounted on said second pivot adjacent said pawl and that has a weight secured thereto,
(f) said pawl responding to blows applied to one side of said coin-handling device to tend to move away from said ratchet wheel,
(g) said lever responding to said blows applied to said coin-handling device to apply a force to said pawl to urge said pawl into holding engagement with said ratchet wheel,
(h) said lever having the center of mass thereof disposed below the level of and to one side of said second pivot, whereby said lever can apply the said force to said pawl when said blows are applied to the bottom as well as to one side of said coin-handling device.

32. In a coin-handling device:
(a) a coin chute which has wide walls and narrow walls,
(b) an elongated slot in one of said narrow walls of said coin chute, and
(c) an actuator that has a shank which extends through said slot, which is generally parallel to said wide walls, and which has an upwardly-bent end,
(d) said upwardly-bent end extending transversely of said wide walls and being spaced from each of said narrow walls and receiving a coin introduced into said chute and keeping said coin from extending down between said shank and an adjacent wall of said coin chute.

33. In a coin-handling device:
(a) a coin chute which has wide walls and narrow walls,
(b) an elongated slot in one of said narrow walls of said coin chute, and
(c) an actuator that has a shank which extends through said slot, which is generally parallel to said wide walls, and which has an upwardly-bent end,
(d) said upwardly-bent end extending transversely of said wide walls and being spaced from each of said narrow walls and receiving a coin introduced into said chute and keeping said coin from extending down between said shank and an adjacent wall of said coin chute,
(e) said slot being narrower than the thickness of said coin,
(f) said upwardly-bent end of said shank being wider than said slot.

34. A coin-handling device that can respond to the insertion of coins to establish credits and that comprises:
(a) a pivot,
(b) a credit-establishing member rotatably mounted on said pivot,
(c) a coin-operated lever that has an actuator with a coin-receiving portion which is adapted to receive coins of a predetermined denomination,
(d) a second coin-operated lever that has an actuator with a coin-receiving portion which is adapted to receive coins of a second predetermined denomination,
(e) a stop that can permit said credit-establishing member to rotate a predetermined angular distance and then halt further rotation of said credit-establishing member,
(f) a second stop that can permit said credit-establishing member to rotate a second predetermined angular distance and then halt further rotation of said credit-establishing member,
(g) the first said stop halting rotation of said credit-establishing member whenever said credit-establishing member is released for movement by the first said coin-operated lever,
(h) said second stop halting rotation of said credit-establishing member whenever said credit-establishing member is released for movement by said second coin-operated lever,
(i) said stops being rotatable and being rotatable independently of each other.

35. A coin-handling device that can respond to the insertion of coins to establish credits and that comprises:
(a) a pivot,
(b) a credit-establishing member rotatably mounted on said pivot,
(c) a coin-operated lever that has an actuator with a coin-receiving portion which is adapted to receive coins of a predetermined denomination and that responds to a coin of said predetermined denomination to move in one direction,
(d) a stationary support that is spaced from said pivot,
(e) a stop that is movably mounted on said stationary support and that is movable into position to block rotation of said credit-establishing member and that is movable out of said position to free said credit-establishing member, and
(f) a connector that extends between said coin-operated lever and said stop,
(g) said connector responding to movement of said coin-operated lever in said one direction to move said stop into position to block rotation of said credit-establishing member and responding to movement of said coin operated lever in the opposite direction to move said stop out of said position.

36. A coin-handling device that can respond to the insertion of coins to establish credits and that comprises:
(a) a pivot, (b) a credit-establishing member that is rotatably mounted on said pivot,
(c) a coin-operated lever that has an actuator with a coin-receiving portion which is adapted to receive coins of a predetermined denomination,
(d) a second coin-operated lever that has an actuator with a coin-receiving portion which is adapted to receive coins of a second predetermined denomination,
(e) a pawl that normally engages said credit-establishing member to prevent rotation of said credit-establishing member but that can move out of engagement with said credit-establishing member to permit rotation of said credit-establishing member,
(f) a second pawl that can move with and relative to said credit-establishing member,
(g) a stop that can intercept said second pawl and hold said second pawl and said credit-establishing member after said credit-establishing member has rotated a predetermined angular distance,
(h) a second stop that can intercept said second pawl and hold said second pawl and said credit-establishing member after said credit-establishing member has rotated a second predetermined angular distance,
(i) said second pawl being movable outwardly of said credit-establishing member after said second pawl and said credit-establishing member have been intercepted and held by either of said stops,
(j) the first said stop being rotatable whereby the portion of the first said stop which receives and holds said second pawl can move with said second pawl as said second pawl is moved outwardly of said credit-establishing member,
(k) said second stop being rotatable whereby the portion of said second stop which receives and holds said second pawl can move with said second pawl as said second pawl is moved outwardly of said credit-establishing member,
(l) whereby a rolling engagement rather than a sliding engagement is provided between said second pawl and the first said and said second stops.

37. In a coin-handling device:
(a) a coin chute which has wide walls and narrow walls,
(b) an elongated recess in one of said wide walls of said coin chute,
(c) an actuator that has a coin-receiving portion disposed within said coin chute in register with said elongated recess and extending generally parallel to said wide walls,
(d) said coin-receiving portion being wider than the width of said coin chute but extending into said elongated recess so its can not simultaneously engage said elongated recess and the opposite wall of said coin chute.

38. A coin-handling device that can respond to the insertion of coins to establish credits and that comprises:
(a) a pivot,
(b) a credit-establishing member rotatably mounted on said pivot,
(c) a pawl that is movable into engagement with said credit-establishing member to cause said pawl to move with said credit-establishing member,
(d) a coin-operated lever that has an actuator with a coin-receiving portion which is adapted to receive coins of a predetermined denomination and that responds to a coin of said predetemined denomination to move in one direction to force said pawl to move into engagement with said credit-establishing member, and
(e) a second pivot that is stationary and that is spaced from the first said pivot,
(f) a stop that is rotatably mounted on said second pivot and that can permit said credit-establishing member to rotate a predetermined angular distance and then halt further rotation of said credit-establishing member by intercepting said pawl, (g) said stop halting rotation of said credit-establishing member whenever said credit-establishing member is released for movement by said lever, (h) said stop being rotatable to minimize frictional forces between said stop and said pawl.

39. In a coin-handling device:

(a) a pivot, (b) a coin-actuated lever rotatably mounted on said pivot, (c) a second pivot, (d) a transfer plate rotatably mounted on said second pivot, (e) an abutment on said coin-actuated lever, and (f) a second abutment on said transfer plate, (g) said abutments being in engagement with each other as said coin-actuated lever and said transfer plate rotate relative to said pivots, (h) the point of engagement between said abutments initially being at one side of a line between said pivots and being at the opposite side of said line after said coin-actuated lever and said transfer plate have rotated relative to said pivots, (i) whereby the engagement between said abutments is a rolling engagement rather than a sliding engagement and whereby the arcs of rotation of said abutments are substantially coincident.

40. In a coin-handling device:

(a) a pivot, (b) a pawl rotatably mounted on said pivot, (c) a second pivot, (d) a transfer plate rotatably mounted on said second pivot, (e) an abutment on said pawl, and (f) a second abutment on said transfer plate, (g) said abutments being in engagement with each other as said pawl and said transfer plate rotate relative to said pivots, (h) the point of engagement between said abutments initially being at one side of a line between said pivots and being at the opposite side of said line after said pawl and said transfer plate have rotated relative to said pivots, (i) whereby the engagement between said abutments is a rolling engagement rather than a sliding engagement and whereby the arcs of rotation of said abutments are substantially coincident.

References Cited by the Examiner

UNITED STATES PATENTS

| | | | |
|---|---|---|---|
| 1,749,792 | 3/30 | Woods | 194—103 |
| 1,966,136 | 7/34 | Richard | 194—9 |
| 2,084,943 | 6/37 | Christopher | 194—103 |
| 2,217,845 | 10/40 | Mueller | 194—19 |
| 2,442,174 | 5/48 | May | 194—9 |
| 2,667,255 | 1/54 | Nielsen | 194—9 |
| 2,929,479 | 3/60 | Pferd | 194—.02 |
| 2,991,867 | 7/61 | Schuller | 194—.02 |

SAMUEL F. COLEMAN, *Primary Examiner.*

WILLIAM B. LA BORDE, *Examiner.*